US011875716B2

(12) United States Patent
Lee et al.

(10) Patent No.: US 11,875,716 B2
(45) Date of Patent: Jan. 16, 2024

(54) DUAL SOURCE DRIVERS, DISPLAY DEVICES HAVING THE SAME, AND METHODS OF OPERATING THE SAME

(71) Applicant: Samsung Electronics Co., Ltd., Suwon-si (KR)

(72) Inventors: Sungho Lee, Hwaseong-si (KR); Hohak Rho, Seongnam-si (KR); Junjae Lee, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 17/691,584

(22) Filed: Mar. 10, 2022

(65) Prior Publication Data

US 2022/0198983 A1 Jun. 23, 2022

Related U.S. Application Data

(63) Continuation of application No. 16/928,480, filed on Jul. 14, 2020, now Pat. No. 11,315,462.

(30) Foreign Application Priority Data

Dec. 27, 2019 (KR) ........................ 10-2019-0176979

(51) Int. Cl.
*G09G 3/20* (2006.01)

(52) U.S. Cl.
CPC ....... *G09G 3/20* (2013.01); *G09G 2310/0291* (2013.01); *G09G 2310/08* (2013.01);
(Continued)

(58) Field of Classification Search
CPC ............. G09G 3/20; G09G 2310/0291; G09G 2310/08; G09G 2320/0673; G09G 2330/023
See application file for complete search history.

(56) References Cited

U.S. PATENT DOCUMENTS 8,754,914 B2 6/2014 Lu
9,265,121 B2 2/2016 Lee
(Continued)

FOREIGN PATENT DOCUMENTS

CN 104932751 A 9/2015
KR 10-2005-0097039 A 10/2005
(Continued)

*Primary Examiner* — Chanh D Nguyen
*Assistant Examiner* — Ngan T. Pham-Lu
(74) *Attorney, Agent, or Firm* — Harness, Dickey & Pierce, P.L.C.

(57) ABSTRACT

A dual source driver includes first and second gamma voltage generators configured to generate first and second gamma voltages, respectively, first and second latches configured to latch first and second data, respectively, a first driving cell configured to receive the first gamma voltage and the first data, and to transmit a first voltage corresponding to the first data and the first gamma voltage to a panel load based on a first switching operation, and a second driving cell configured to receive the second gamma voltage and the second data, and to transmit a second voltage corresponding to the second data and the second gamma voltage to the panel load based on a second switching operation. The first switching operation and the second switching operation may operate complementarily to each other.

19 Claims, 27 Drawing Sheets

(52) U.S. Cl.
CPC ............... *G09G 2320/0673* (2013.01); *G09G 2330/023* (2013.01)

(56) References Cited

U.S. PATENT DOCUMENTS

| | | | | |
|---|---|---|---|---|
| 9,430,963 | B2 | 8/2016 | Shin et al. | |
| 2001/0022570 | A1 | 9/2001 | Chang et al. | |
| 2002/0044118 | A1 | 4/2002 | Sekido et al. | |
| 2005/0248971 | A1 | 11/2005 | Lee et al. | |
| 2006/0125671 | A1* | 6/2006 | Chang | G09G 3/20 341/144 |
| 2008/0224980 | A1 | 9/2008 | Senda et al. | |
| 2009/0009498 | A1 | 1/2009 | Nishimura | |
| 2009/0146934 | A1 | 6/2009 | Hong et al. | |
| 2009/0278779 | A1 | 11/2009 | Liu et al. | |
| 2012/0105494 | A1 | 5/2012 | Lee et al. | |
| 2014/0320464 | A1 | 10/2014 | Ryu et al. | |
| 2016/0042695 | A1 | 2/2016 | Park et al. | |
| 2016/0180764 | A1 | 6/2016 | Noh et al. | |
| 2016/0284313 | A1 | 9/2016 | Lin et al. | |
| 2017/0309219 | A1* | 10/2017 | Kong | G09G 3/2003 |
| 2018/0226009 | A1* | 8/2018 | Lin | G09G 3/2003 |
| 2020/0243035 | A1 | 7/2020 | Tanaka et al. | |

FOREIGN PATENT DOCUMENTS

| | | | |
|---|---|---|---|
| KR | 10-2008-0111848 | A | 12/2008 |
| KR | 10-2009-0060819 | A | 6/2009 |
| KR | 10-2012-0044401 | A | 5/2012 |
| KR | 10-1903527 | B1 | 10/2018 |

* cited by examiner

DUAL SOURCE DRIVERS, DISPLAY DEVICES HAVING THE SAME, AND METHODS OF OPERATING THE SAME

CROSS-REFERENCE TO RELATED APPLICATIONS

This application is a continuation of U.S. application Ser. No. 16/928,480, filed Jul. 14, 2020, which claims the benefit, under 35 U.S.C. § 119, of Korean Patent Application No. 10-2019-0176979 filed on Dec. 27, 2019 in the Korean Intellectual Property Office, the entire disclosures of each of which are incorporated herein by reference for all purposes.

BACKGROUND

The present inventive concepts relate to dual source drivers, display devices including the same, and methods of operating the same.

Generally, column driver integrated circuits (CDICs) supply a specific voltage to display devices by changing data every line. The line time decreases as the resolution of display devices increases, and a specific voltage should be charged to the display load within a limited period of time. In a general driving chip, CDIC data is changed every line, and thus, a specific voltage is selected from a digital analog converter (DAC), the input of an output amplifier is changed, and the display panel load is charged by the output amplifier. However, as line time gradually decreases, the delay time of data change, DAC operation, input of the output amplifier and the like are affecting the output speed. Accordingly, there is a problem in that a sufficient voltage is not charged to a panel load in one line.

SUMMARY

Some example embodiments provide dual source drivers for improving a display panel load charging rate, display devices including the same, and methods of operating the same.

According to some example embodiments, a dual source driver may include a first gamma voltage generator configured to generate a first gamma voltage, a second gamma voltage generator configured to generate a second gamma voltage, a first latch configured to latch first data, a second latch configured to latch second data, a first driving cell configured to receive the first gamma voltage from the first gamma voltage generator and to receive the first data from the first latch, and to transmit a first voltage corresponding to the first data and the first gamma voltage to a panel load based on a first switching operation, and a second driving cell configured to receive the second gamma voltage from the second gamma voltage generator and to receive the second data from the second latch, and to transmit a second voltage corresponding to the second data and the second gamma voltage to the panel load based on a second switching operation. The first switching operation and the second switching operation may operate complementarily to each other.

According to some example embodiments, a display device may include a panel including a plurality of gate lines and a plurality of source lines extending in directions that cross each other, the panel further including a plurality of pixels at separate, respective intersections of gate lines and source lines, a gate driver configured to drive any one gate line of the plurality of gate lines in response to a horizontal synchronization signal and a gate control signal, a dual source driver configured to drive the plurality of source lines according to data, and a timing controller configured to receive a clock signal, the data, a vertical synchronization signal, and the horizontal synchronization signal, the timing controller further configured to control the gate driver and the dual source driver. The dual source driver may include a first driving cell and a second driving cell both corresponding to each source line of the plurality of source lines. The dual source driver may be configured to operate such that, one driving cell of the first driving cell or the second driving cell performs a charging operation concurrently with another driving cell of the first driving cell or the second driving cell performing a latency operation.

According to some example embodiments, a method of operating a display device that includes a dual source driver having a first driving cell and a second driving cell corresponding to a single source line may include causing the second driving cell to perform a first latency operation and concurrently causing the first driving cell to perform a first charging operation, in a first line time period, and causing the second driving cell to perform a second charging operation in the second driving cell and concurrently causing the first driving cell to perform a second latency operation, in a second line time period.

BRIEF DESCRIPTION OF DRAWINGS

The above and other aspects, features, and advantages of the present inventive concepts will be more clearly understood from the following detailed description, taken in conjunction with the accompanying drawings, in which.

DETAILED DESCRIPTION

Figure 1:
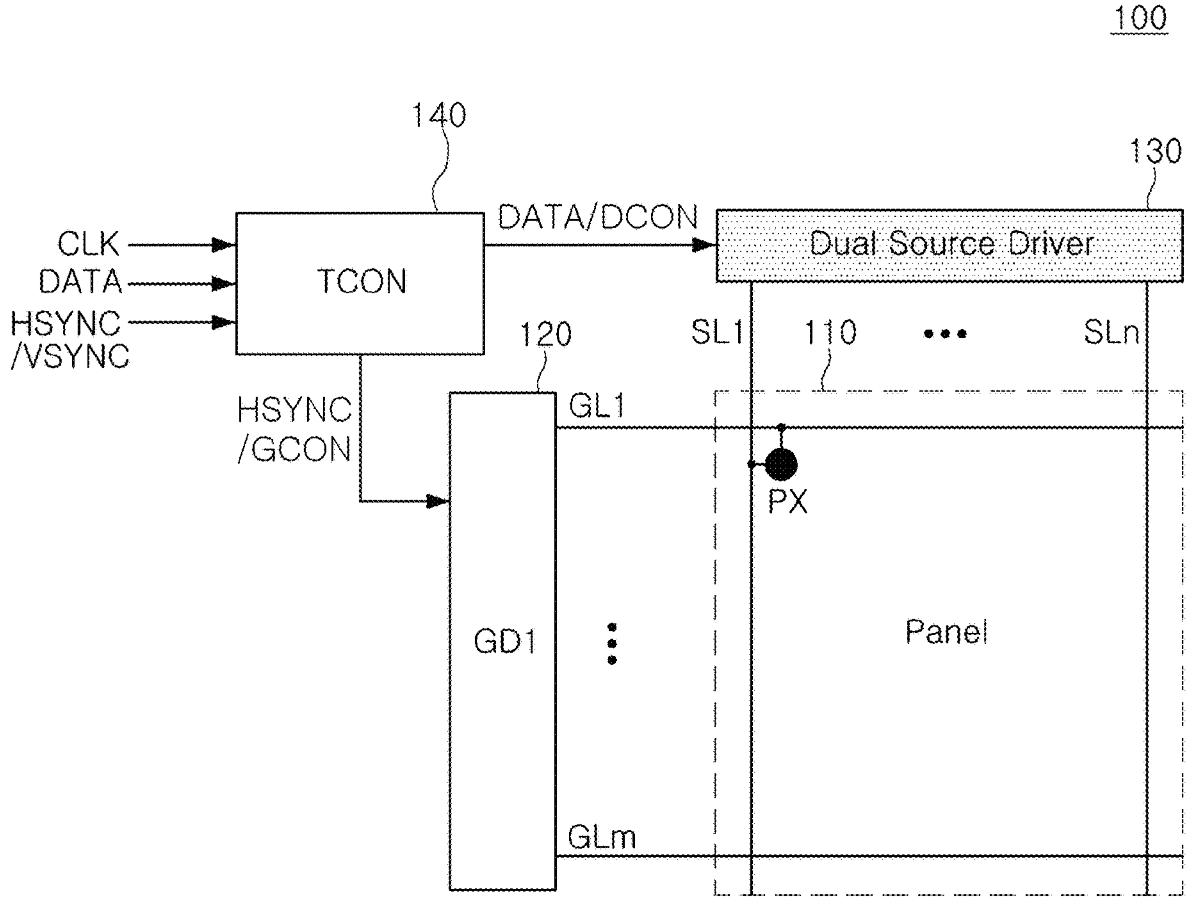
FIG. 1 is a drawing illustrating a display device according to some example embodiments.

Hereinafter, some example embodiments will be described in detail with reference to the accompanying drawings.

It will be understood that elements and/or properties thereof may be recited herein as being "the same" or "equal" as other elements, and it will be further understood that elements and/or properties thereof recited herein as being "the same" as or "equal" to other elements may be "the same" as or "equal" to or "substantially the same" as or "substantially equal" to the other elements and/or properties thereof. Elements and/or properties thereof that are "substantially the same" as or "substantially equal" to other elements and/or properties thereof will be understood to include elements and/or properties thereof that are the same as or equal to the other elements and/or properties thereof within manufacturing tolerances and/or material tolerances. Elements and/or properties thereof that are the same or substantially the same as other elements and/or properties thereof may be structurally the same or substantially the same, functionally the same or substantially the same, and/or compositionally the same or substantially the same.

It will be understood that elements and/or properties thereof (e.g., structures, properties of one or more elements, lengths, distances, energy levels, energy barriers, or the like) described herein as being the "substantially" the same encompasses elements and/or properties thereof (e.g., structures, properties of one or more elements, lengths, distances, energy levels, energy barriers, or the like) that are the same within manufacturing tolerances and/or material tolerances and/or elements and/or properties thereof (e.g., structures, properties of one or more elements, lengths, distances, energy levels, energy barriers, or the like) that have a relative difference in magnitude that is equal to or less than 10%. Further, regardless of whether elements and/or properties thereof (e.g., structures, properties of one or more elements, lengths, distances, energy levels, energy barriers, or the like) are modified as "substantially," it will be understood that these elements and/or properties thereof (e.g., structures, properties of one or more elements, lengths, distances, energy levels, energy barriers, or the like) should be construed as including a manufacturing or operational tolerance (e.g., ±10%) around the stated elements and/or properties thereof (e.g., structures, properties of one or more elements, lengths, distances, energy levels, energy barriers, or the like).

When the terms "about" or "substantially" are used in this specification in connection with a numerical value, it is intended that the associated numerical value include a tolerance of ±10% around the stated numerical value. When ranges are specified, the range includes all values therebetween such as increments of 0.1%.

Where elements, properties, or the like are described herein to have a "small" or "very small" difference between each other, it will be understood that a variation between the magnitudes of said elements and/or properties may be equal to or less than 10% of the magnitudes of the elements, properties, or the like being described.

It will be understood that some or all of any of the devices, controllers, drivers, units, modules, or the like according to any of the example embodiments as described herein, including some or all of any of the display device 100, gate driver 120, dual source driver 130, timing controller 140, data pattern determiner 137, display drive integrated circuit 1000, mobile device 2000, foldable smartphone 3000, electronic device 4000, monitor 5000, any combination thereof, or the like may be included in, may include, and/or may be implemented by one or more instances of processing circuitry such as hardware including logic circuits, a hardware/software combination such as a processor executing software; or a combination thereof. For example, said one or more instances of processing circuitry may include, but are not limited to, a central processing unit (CPU), an application processor (AP), an arithmetic logic unit (ALU), a graphic processing unit (GPU), a digital signal processor, a microcomputer, a field programmable gate array (FPGA), a System-on-Chip (SoC) a programmable logic unit, a microprocessor, or an application-specific integrated circuit (ASIC), etc. In some example embodiments, any of the memories, memory units, or the like as described herein may include a non-transitory computer readable storage device, for example a solid state drive (SSD), storing a program of instructions, and the one or more instances of processing circuitry may be configured to execute the program of instructions to implement the functionality of some or all of any of the devices, controllers, drivers, units, modules, or the like according to any of the example embodiments as described herein, including any of the methods of operating any of same as described herein.

In dual source drivers according to some example embodiments, display devices including the same, and methods of operating the same, a panel load is driven with a first driving cell configured to perform a charging operation on one line, and a latency operation is performed with a second driving cell. Accordingly, in the dual source drivers according to some example embodiments, display devices including the same, and methods of operating the same, delays such as existing data change, DAC operation, and input of an output amplifier may be eliminated, thereby resulting in improved operational performance of said dual source drivers and/or display devices including the same. In addition, in dual source drivers according to some example embodiments, display devices including the same, and methods of operating the same, output speed may be improved to enable sufficient voltage charging for a panel load in one line, thereby resulting in improved operational performance of said dual source drivers and/or display devices including the same.

FIG. 1 is a drawing illustrating a display device 100 according to some example embodiments. Referring to FIG. 1, the display device 100 may include a panel 110, a gate driver 120, a dual source driver 130, and a timing controller (TCON) 140.

The panel 110 may be implemented as a thin film transistor-liquid crystal display (TFT-LCD) panel, a light emitting diode (LED) display panel, an organic LED (OLED) display panel, an active matrix OLED (AMOLED) display panel, a flexible display panel, or the like.

As shown in FIG. 1, the panel 110 may include a plurality of gate lines GL1 to GLm (m is an integer of 2 or more) and a plurality of source lines SL1 to SLn (n is an integer of 2 or more) extending in directions that cross each other (e.g., the gate lines GL1 to GLm may extend in parallel in a first direction and the source lines SL1 to SLn may extend in parallel in a second direction that intersects the first direction, for example is perpendicular to the first direction). The panel 110 may include a plurality of pixels formed on portions on which the gate lines GL1 to GLm and source lines SL1 to SLn intersect each other. Restated, the panel 110 may include a plurality of pixels that are located at separate, respective intersections of the gate lines GL1 to GLm and source lines SL1 to SLn. In some example embodiments, the pixels may be implemented in a structure in which sub-pixels red, green and blue are disposed adjacent to each other with respect to a designated color display. One pixel PX may include RGB sub-pixels (an RGB stripe layout structure) or RGGB sub-pixels (a pentile layout structure). In some example embodiments, the arrangement structure of the RGGB sub-pixels may be replaced with the arrangement structure of the RGBG sub-pixels. In some example embodiments, the pixel PX may be replaced with an RGBW sub-pixel arrangement structure. In some example embodiments, the structure of the pixel PX of some example embodiments is not limited thereto.

The gate driver 120 may be implemented to select a gate line and drive the gate line by sequentially providing the gate line selection signals synchronized with the horizontal synchronization signal HSYNC to the gate lines GL1 to GLm, in response to the horizontal synchronization signal HSYNC and a gate control signal GCON. In general, a frame of an image displayed by the panel 110 may be divided by a vertical synchronization signal VSYNC, and a horizontal line of an image may be divided by a horizontal synchronization signal HSYNC. In some example embodiments, the horizontal synchronization signal HSYNC and the gate line selection signal may be synchronized. For example, during one horizontal synchronization signal HSYNC period, and thus in response to the horizontal synchronization signal HSYNC and a gate control signal GCON, the gate driver 120 may enable one gate line selection signal, and thus may provide the one gate line selection signal to the gate lines GL1 to GLm of the panel 110. Accordingly, the gate driver 120 may be configured to drive any one gate line of the plurality of gate lines in response to the horizontal synchronization signal HSYNC and the gate control signal GCON. In some example embodiments, the gate driver 120 may be implemented as an integrated circuit.

The dual source driver 130 may include dual driving cells configured to load data (e.g., data received from an external device) on a plurality of source lines SL1 to SLn, and thus the dual source driver 130 may be configured to drive the plurality of source lines SL1 to SLn according to the data. In some example embodiments, each of the dual driving cells may include a first driving cell 131 and a second driving cell 132 as shown in at least FIGS. 2A-2B. As shown, the first driving cell 131 and the second driving cell 132 both correspond to each source line of the plurality of source lines SL1 to SLn. The first driving cell 131 and the second driving cell 132 may alternately provide an analog voltage corresponding to data to a corresponding panel load by a switching operation. For example, when the first driving cell 131 may be configured to perform a charging operation of providing an analog voltage corresponding to data (e.g., a first data signal, also referred to herein as "first data") to a corresponding source line, the second driving cell 132 may be configured to perform a latency operation of preparing an analog voltage corresponding to data (e.g., a second data signal, also referred to herein as "second data") to be provided to a corresponding source line. Conversely, when the first driving cell 131 may be configured to perform a latency operation to prepare an analog voltage corresponding to data (e.g., first data) to be provided to a corresponding source line, the second driving cell 132 may be configured to perform a charging operation of providing an analog voltage corresponding to data (e.g., second data) to a corresponding source line. Restated, the dual source driver 130 may be configured to operate such that, one driving cell of the first driving cell 131 or the second driving cell 132 performs a charging operation concurrently with another driving cell of the first driving cell or the second driving cell performing a latency operation.

The dual source driver 130, although not illustrated, may include a shift register, a latch circuit, a digital to analog converter, and an output buffer circuit. The latch circuit may include a sampling circuit for sampling data and a holding latch for storing data sampled by the sampling circuit. The shift register may control the operation timing of each of the plurality of sampling circuits included in the latch circuit in response to the horizontal synchronization signal HYSNC. The latch circuit may sample and store the output data according to the shift order of the shift register. The latch circuit may output the output data (e.g., digital image data) to a digital-to-analog converter. The digital-to-analog converter may convert digital image data (e.g., data received from the latch circuit) to source voltage. In some example embodiments, the source voltage generated by the digital-to-analog converter may be output to a plurality of source lines SL1 to SLn through an output buffer circuit. The source voltage output to each of the plurality of source lines SL1 to SLn may be input to a pixel connected to the gate line scanned by the gate driver 120. In some example embodiments, the dual source driver 130 may be implemented by at least one integrated circuit.

The timing controller TCON 140 may be implemented to control the overall operation of a display device 100. The timing controller 140 may generate a gate control signal GCON controlling the operation timing of the gate driver 120 and a data control signal DCON controlling the operation timing of the dual source driver 130, using a timing signal input (e.g., received) from an external device, for example, a vertical synchronization signal VSYNC, a horizontal sync signal HSYNC, or a clock CLK, also referred to interchangeably herein as a "clock signal". In addition, the timing controller 140 may receive data (DATA) from an external device and rearrange the data as the image data to be transmitted to the dual source driver 130.

In some example embodiments, in FIG. 1, one dual source driver is illustrated for convenience of description. However, the display device 100 according to some example embodiments may include a plurality of dual source drivers. In some example embodiments, the timing controller 140 may be connected to each of a plurality of dual source drivers in a point-to-point manner. The timing controller 140 may transmit compressed image data according to the clock signal CLK to the dual source drivers individually connected according to the point-to-point scheme.

In a general display device, since the horizontal line time is reduced as the display panel has a high frame rate and a high resolution, it is difficult to obtain charging within a relatively short time with a voltage specific to the display panel load. Meanwhile, the display device 100, according to some example embodiments, may improve the display panel load charging rate, and thereby improve operational performance of the display device 100, based on having a dual source driver 130 configured to perform chopping for charging operation and latency operation.

Figure 2A:
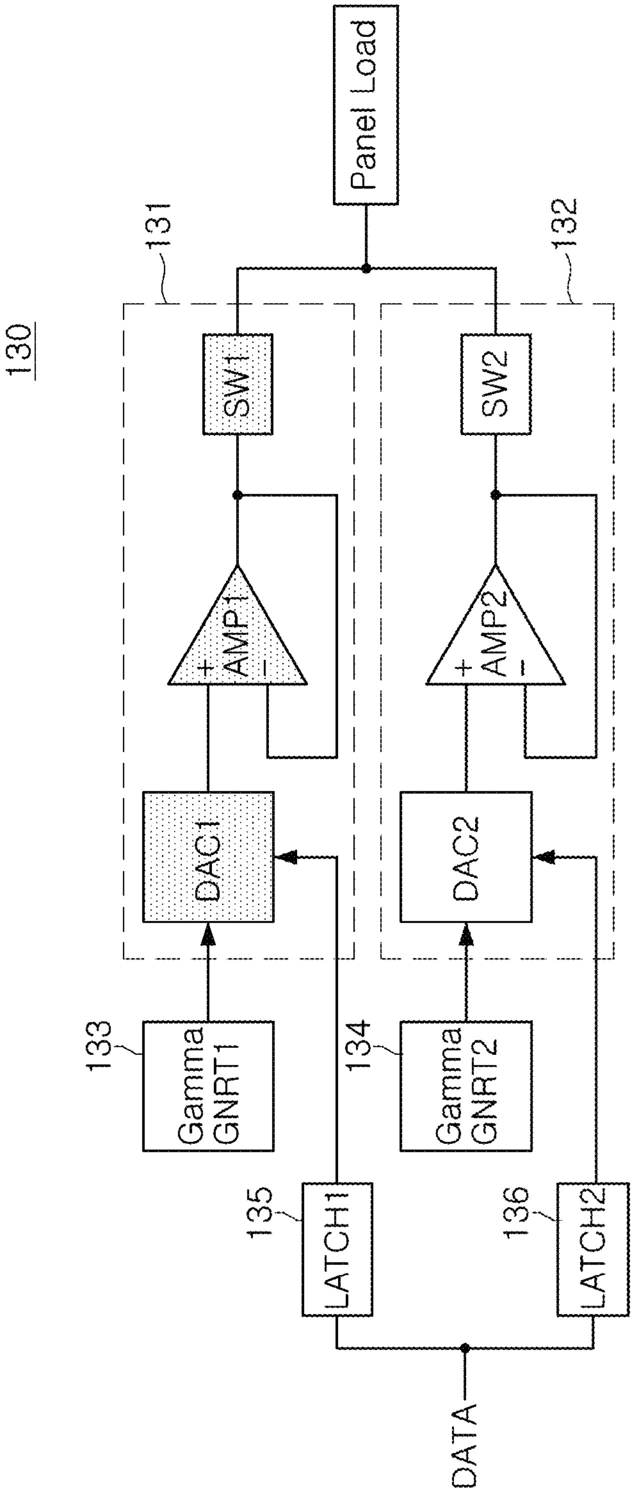
FIGS. 2A and 2B are drawings illustrating dual source drivers according to some example embodiments.
Figure 2B:
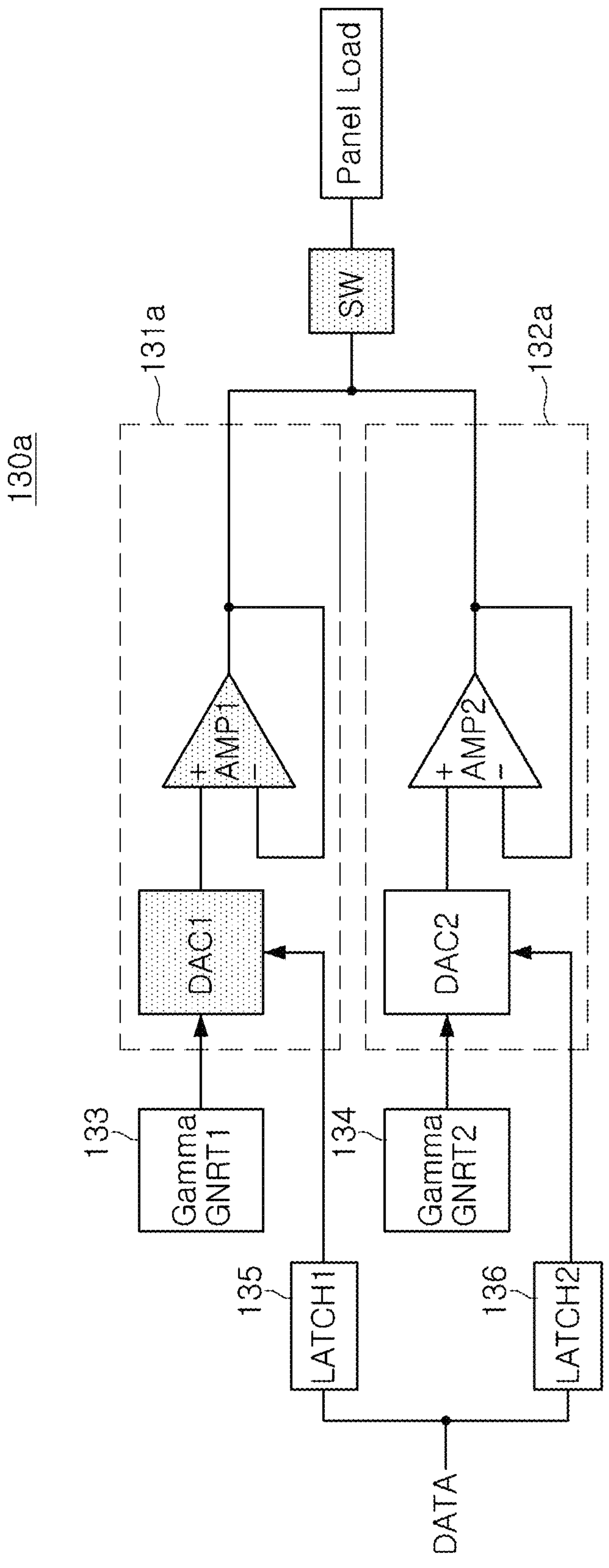

FIGS. 2A and 2B are diagrams illustrating a dual source driver according to some example embodiments. Referring to FIG. 2A, the dual source driver 130 includes a first driving cell 131, a second driving cell 132, a first gamma voltage generator 133, a second gamma voltage generator 134, a first latch 135, and a second latch 136. In some example embodiments, the dual source driver 130 illustrated in FIG. 2 corresponds to any one source line. A "latch" as described herein may be interchangeably referred to as a latch circuit, a flip-flop, a flop-flop circuit, any combination thereof, or the like.

In some example embodiments, the first gamma voltage generator 133 and the second gamma voltage generator 134 may generate a same gamma voltage.

The first gamma voltage generator 133 may be configured to generate a first gamma voltage, and the second gamma voltage generator 134 may be configured to generate a second gamma voltage. The first and second gamma voltages may be a same gamma voltage. The first gamma voltage generated by the first gamma voltage generator 133 may be input to a first digital-to-analog converter DAC1 of the first driving cell 131. The first digital-to-analog converter DAC1 may receive the first data from the first latch 135, may convert the first data into a first analog voltage based on the first gamma voltage, and thus may output the first analog voltage based on the first gamma voltage and the received first data, and thus the first driving cell 131 may generate a voltage (e.g., the first analog voltage) corresponding to the first data and the first gamma voltage. A first output amplifier AMP1 may receive and amplify the output voltage of the first digital-to-analog converter DAC1 (e.g., amplify the first analog voltage). The first output amplifier AMP1 may amplify the first analog voltage based on comparing an output value of the first digital-to-analog converter DAC1 and an output value of an output terminal of the first output amplifier AMP1, where the output value of the first digital-to-analog converter DAC1 is received at a first input terminal of the first output amplifier AMP1 and the output value of the output terminal of the first output amplifier is received at a second input terminal of the first output amplifier AMP1. A first switch SW1 may load the output voltage of the first output amplifier AMP1, which corresponds to the first analog voltage that corresponds to the first data and the first gamma voltage, to the corresponding source line according to the first switching operation. Restated, the first switch SW1 may transmit (e.g., selectively transmit) an output of the first output amplifier AMP1 (e.g., an output that is the amplified first output voltage) to the panel load according to the first switching operation. Accordingly, the first driving cell 131 may be configured to receive the first gamma voltage from the first gamma voltage generator 133 and to receive the first data from the first latch 135, and the first driving cell 131 may be further configured to transmit a first voltage corresponding to the first data and the first gamma voltage (e.g., the output voltage of the first output amplifier AMP1) to a panel load based on a first switching operation (e.g., the operation of the first switch SW1).

In some example embodiments, the second gamma voltage generated by the second gamma voltage generator 134 may be input to a second digital-to-analog converter DAC2 of the second driving cell 132. The second digital-to-analog converter DAC2 may receive second data from the second latch 136 and output a second analog voltage using the second gamma voltage and the received second data, and thus the second driving cell 132 may generate a voltage (e.g., the second analog voltage) corresponding to the second data and the second gamma voltage. The second output amplifier AMP2 may receive and amplify the output voltage of the second digital-to-analog converter DAC2 (e.g., amplify the second analog voltage). The second output amplifier AMP2 may amplify the second analog voltage based on comparing an output value of the second digital-to-analog converter DAC2 and an output value of an output terminal of the second output amplifier AMP2, where the output value of the second digital-to-analog converter DAC2 is received at a second input terminal of the second output amplifier AMP2 and the output value of the output terminal of the second output amplifier is received at a second input terminal of the second output amplifier AMP2. A second switch SW2 may load the output voltage of the second output amplifier AMP2, which corresponds to the second analog voltage that corresponds to the second data and the second gamma voltage, to a corresponding source line according to the second switching operation. Restated, the second switch SW2 may transmit (e.g., selectively transmit) an output of the second output amplifier AMP2 (e.g., an output that is the amplified second output voltage) to the panel load according to the second switching operation. Accordingly, the second driving cell 132 may be configured to receive the second gamma voltage from the second gamma voltage generator 134 and to receive the second data from the second latch 136, and the second driving cell 132 may be further configured to transmit a second voltage corresponding to the second data and the second gamma voltage (e.g., the output voltage of the second output amplifier AMP2) to the panel load based on a second switching operation (e.g., the operation of the second switch SW2).

In some example embodiments, the first and second switches SW1 and SW2 may perform switching operations complementary to each other. Restated, the first and second switches SW1 and SW2 may perform first and second switching operations, respectively, where the first and second switching operations are complementary to each other, for example such that a result of the first switching operation is a negative of a result of the second switching operation. For example, when the first switch SW1 is turned on by the first switching operation, the second switch SW2 may be turned off through the second switching operation. Accordingly, each switch SW1 and SW2 is configured to determine, according to a respective first or second switching operation, whether to selectively provide an output of an output amplifier (e.g., the first or second output amplifier AMP1, AMP2, respectively) to a corresponding source line of the plurality of source lines SL1 to SLn.

In some example embodiments, the first switch SW1 of the first driving cell 131 is activated for each 2Nth source line to perform a charging operation for the panel load with the output voltage of the first output amplifier AMP1, and is deactivated for each 2N+1th source line to perform a latency operation of preparing the first output amplifier AMP1 with a specific voltage. In addition, the second switch SW2 of the second driving cell 132 is activated for each 2N+1 source line to perform a charging operation for the panel load with the output voltage of the second output amplifier AMP2, and is deactivated for each 2N-th source line to perform a latency operation of preparing the second output amplifier AMP2 with a specific voltage.

In view of at least the above, it will be understood that, as shown in FIG. 2A, in some example embodiments each driving cell of the first driving cell 131 and the second driving cell 132 includes a digital-to-analog converter (DAC1/DAC2) configured to convert received data (e.g., digital image signal) to an analog voltage, an output amplifier (AMP1/AMP2) configured to amplify the output of the digital-to-analog converter (e.g., the analog voltage), and a switch (SW1/SW2) configured to determine whether to selectively provide an output of the output amplifier to a corresponding source line from among the plurality of source lines SL1 to SLn according to a particular switching operation (first/second switching operation).

As illustrated in FIG. 2A, the first and second driving cells 131 and 132 are provided with the switches SW1 and SW2, respectively, for connection to a panel load. However, the dual source driver according to some example embodiments need not be limited thereto. For example, as illustrated in FIG. 2B, the dual source driver 130*a* may include as a single switch SW sharing outputs of the first and second driving cells 131*a* and 132*a* (e.g., the single switch SW has separate inputs that are separately connected to a separate driving cell of the first driving cell 131*a* or the second driving cell 132*a*) such that the switch SW is configured to transmit a selected output of (e.g., selectively transmit one of) an output of the first output amplifier AMP1 or an output of the second output amplifier AMP2 to the panel load.

Figure 3A:
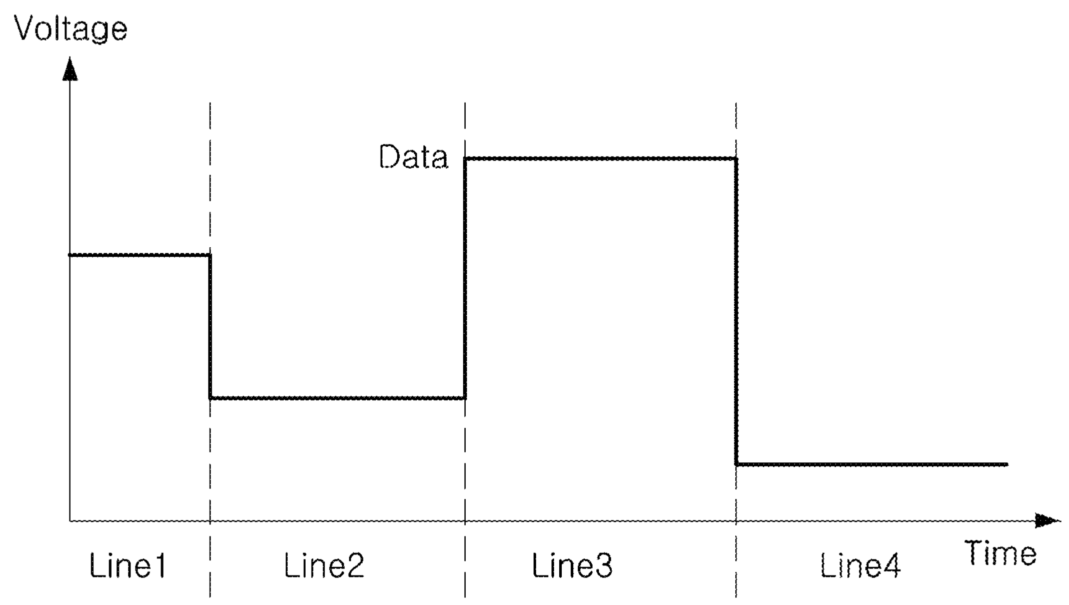
FIGS. 3A and 3B are drawings illustrating an output waveform of a dual source driver according to some example embodiments.
Figure 3B:
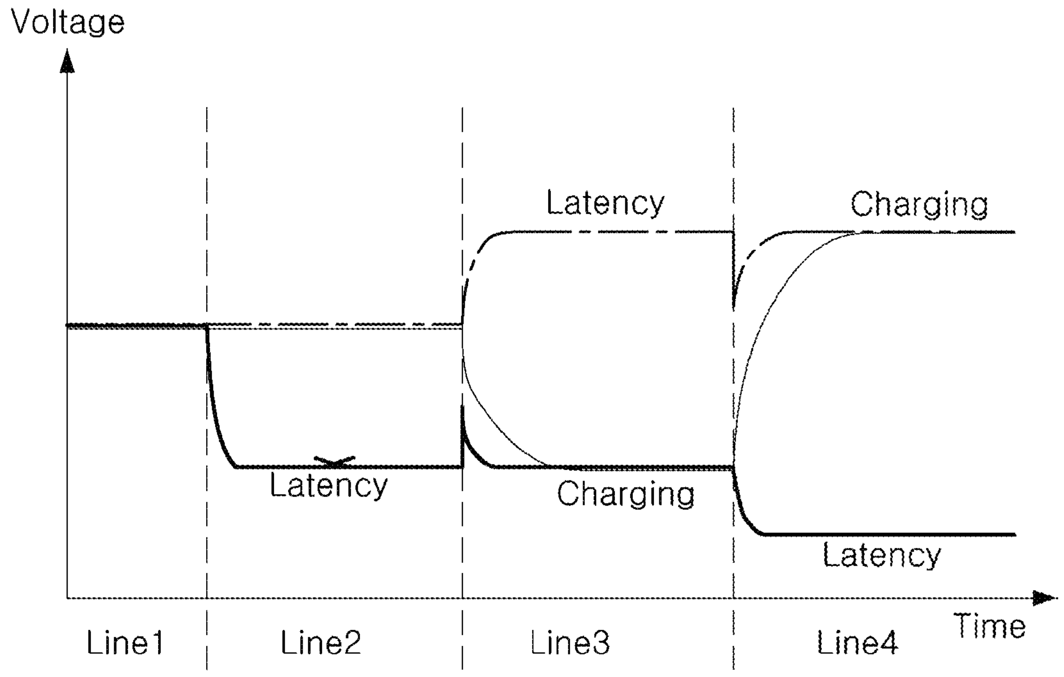

FIGS. 3A and 3B are drawings illustrating an output waveform of the dual source driver 130 according to some example embodiments. Referring to FIG. 3A, different voltages corresponding to four source lines may be received. Referring to FIG. 3B, data loading of the second source line may proceed as follows. After performing the latency operation in the first driving cell 131, when the latency operation is performed in the second driving cell 132 with respect to the third source line, a charging operation for the second source line may be simultaneously performed. Similarly, data loading of the third source line may proceed as follows. After performing the latency operation in the second driving cell 132, when the latency operation on the fourth source line is performed, the charging operation on the third source line may be performed at the same time. As indicated at FIGS. 3A-3B in relation to FIG. 2A, the first and second switching operations, which are complementary to each other, may include first and second switching signals that each switch between high/low states to cause the respective first and second switches SW1/SW2 to switch between being activated or deactivated in a complementary manner (where one switch is activated while the other switch is deactivated) at regular (e.g., constant), particular intervals (e.g., separate line times), so as to cause the output to the panel load to be switched between the first and second driving cells 131, 132 at said regular intervals (e.g., line times). As indicated at FIGS. 3A-3B in relation to FIG. 2B, the first and second switching operations, which are complementary to each other, may include a switching signal that switches between high/low states to cause the switch SW2 to switch between two states at regular (e.g., constant), particular intervals (e.g., separate time lines), so as to cause the output to the panel load to be switched between the first and second driving cells 131, 132 at said regular intervals (e.g., line times).

Figure 4A:
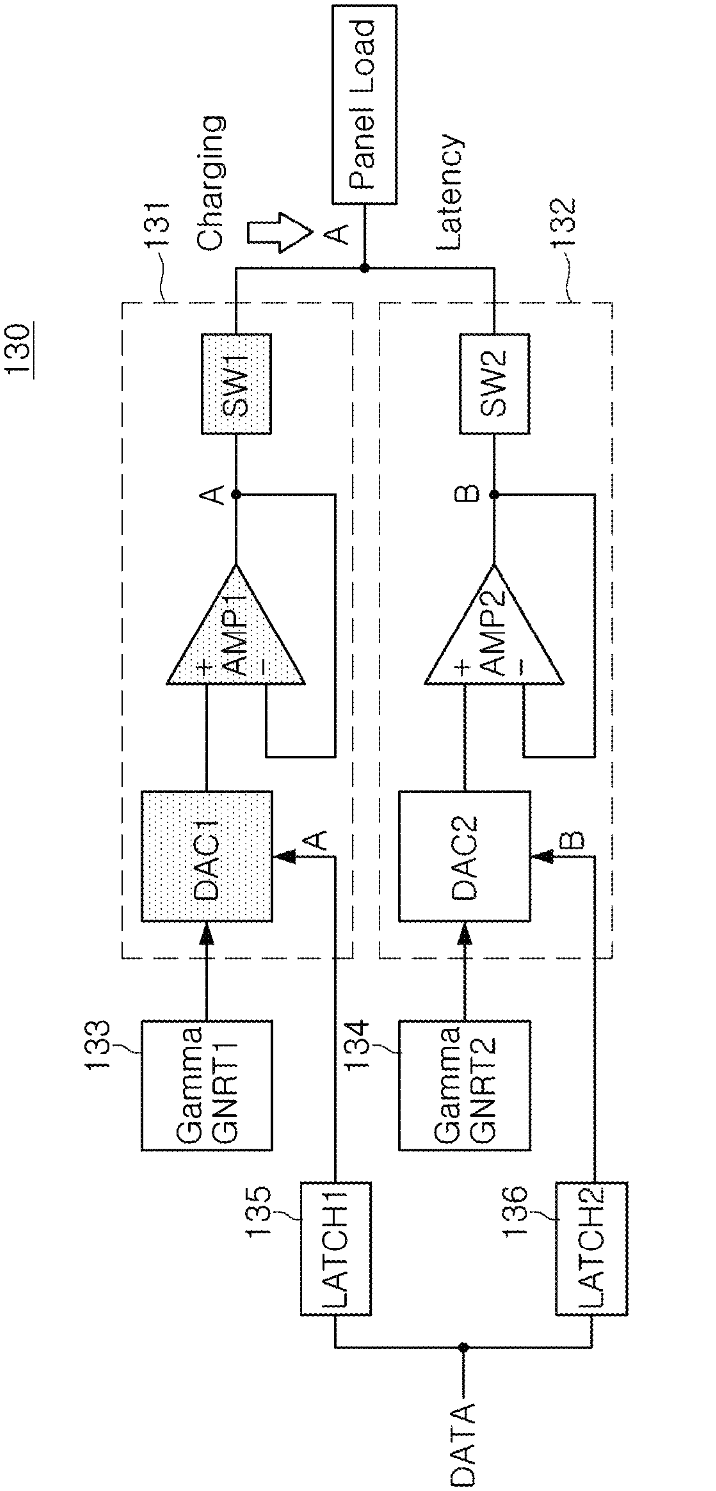
FIGS. 4A and 4B are diagrams illustrating charging and latency operations of first and second driving cells according to some example embodiments.
Figure 4B:
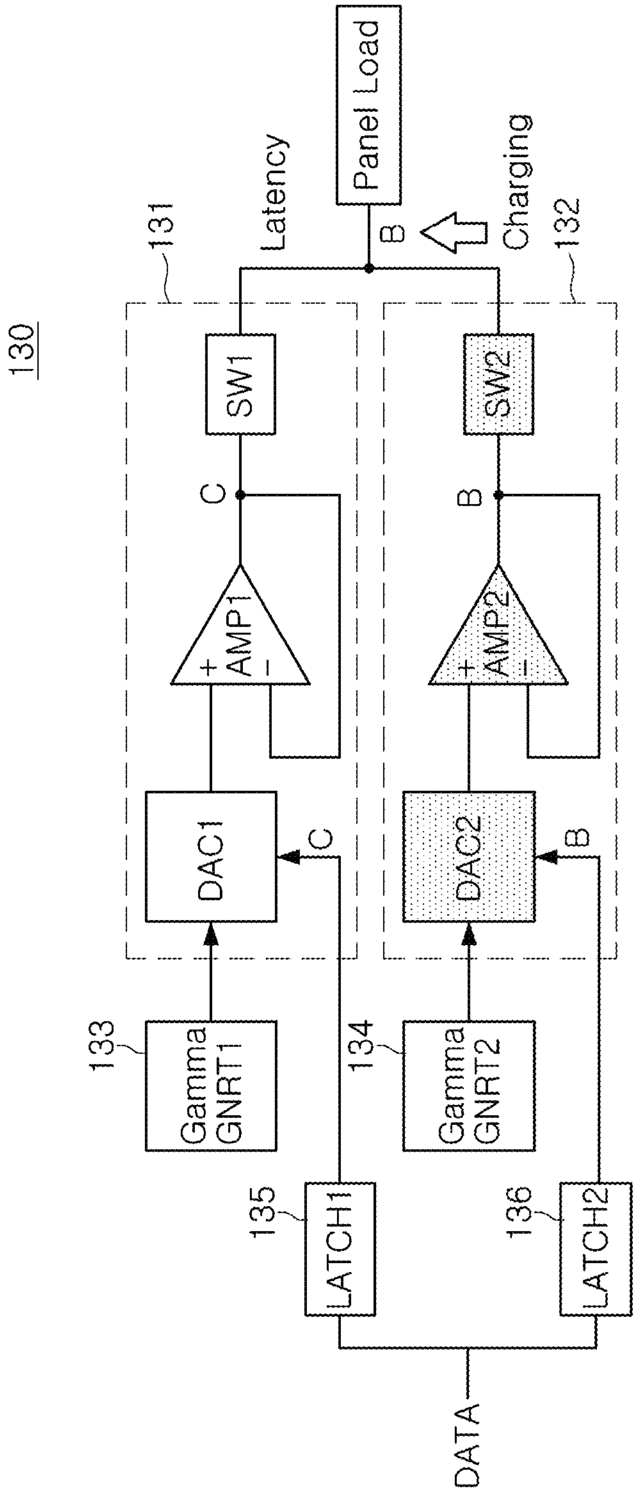

FIGS. 4A and 4B are diagrams illustrating charging and latency operations of the first and second driving cells 131 and 132 according to some example embodiments.

FIG. 4A is a diagram illustrating a charging operation of the first driving cell 131 according to some example embodiments. Referring to FIG. 4A, in the case of the 2N-th line, the charging operation may be performed as the first switch SW1 is activated according to a first switching operation in the first driving cell 131 and is connected to the panel load. At this time, in the second driving cell 132, the second switch SW2 is deactivated according to a second switching operation, data is received through the second latch 136, and the second digital-to-analog converter DAC2 assigns a specific voltage to the second output amplifier AMP2, and the second output amplifier AMP2 may perform a latency operation with a specific voltage.

FIG. 4B is a drawing illustrating a charging operation of the second driving cell 132 according to some example embodiments. Referring to FIG. 4B, in the case of 2N+1 line, the second switch SW2 is activated according to the second switching operation in the second driving cell 132 and connected to the panel load, so that a charging operation may be performed. At this time, the first switch SW1 is deactivated according to the first switching operation in the first driving cell 131, data is received through the first latch 135, and the first digital-to-analog converter DAC1 assigns a specific voltage to the first output amplifier AMP1, and the first output amplifier AMP1 may perform a latency operation with a specific voltage.

Figure 5:
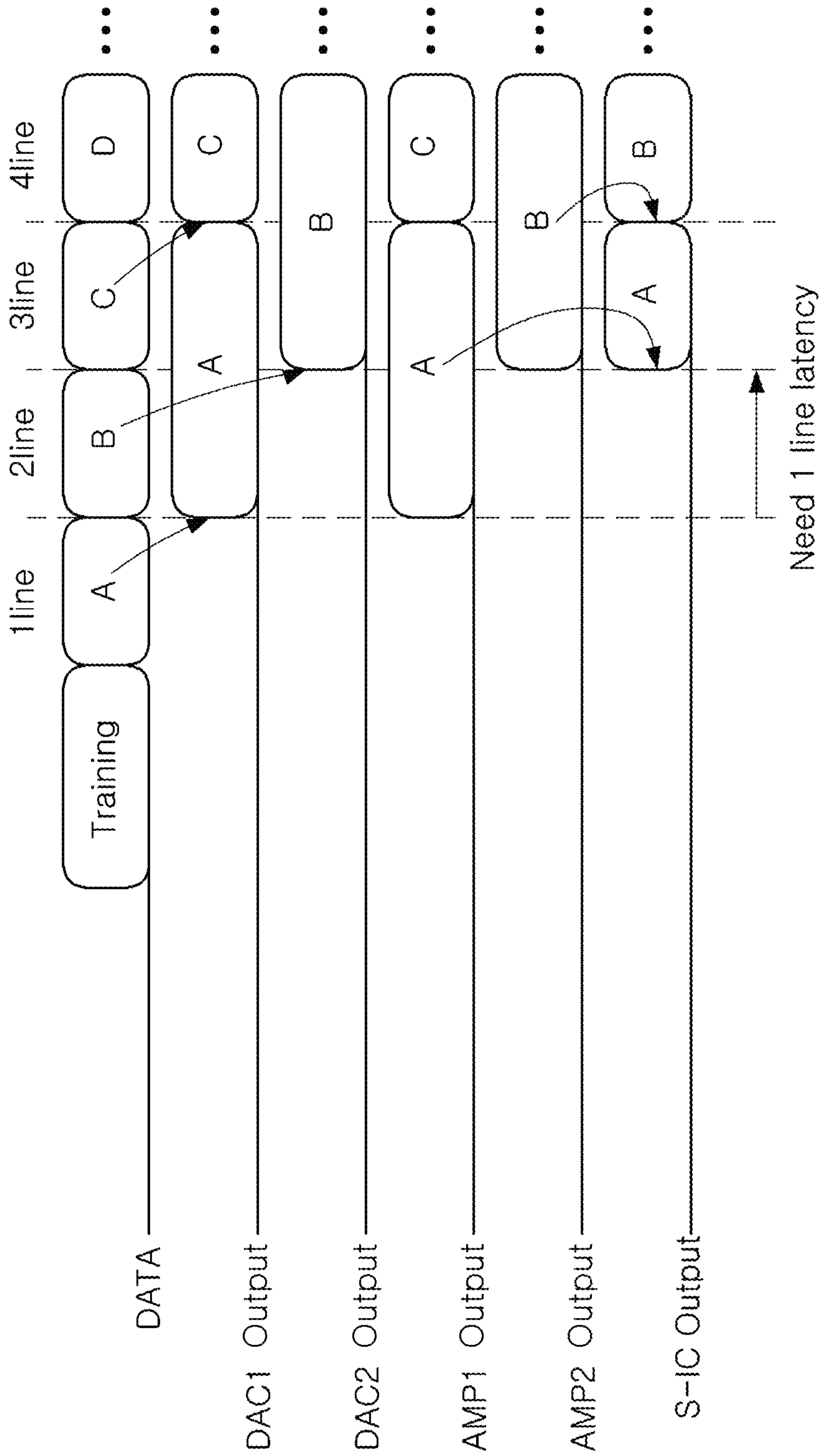
FIG. 5 is a diagram illustrating an operation timing of a dual source driver according to some example embodiments.

FIG. 5 is a diagram illustrating an operation timing of the dual source driver 130 according to some example embodiments. Referring to FIG. 5, the dual source driver 130 drives the panel load with one driving cell for 1-line time, and enables data change, DAC operation, and output amplification with a latency operation with the other one driving cell. As a result, delays due to input of data change, DAC operation, and output amplification may be eliminated. Therefore, by improving the output speed, a sufficient voltage may be charged to the panel load within 1-line time. In some example embodiments, the 1-line time may be a time period between about 2 μs and about 3 μs. In some example embodiments, the 1-line time is a time at which line data is transmitted and may be a cycle of the clock CLK (see FIG. 1). However, it should be understood that the 1-line time according to some example embodiments is not limited thereto.

In some example embodiments, a training period refers to the time to lock clock data recovery (CDR) at a particular (or, alternatively, predetermined) frequency at an interface using a clock embedding method. In some example embodiments, the particular frequency may be locked during the training period using a Delay Locked Loop (DLL) or a Phase Locked Loop (PLL).

As illustrated in FIG. 5, data A is latched in a first line time period, data B is latched in a second line time period, data C is latched in a third line time period, and data D may be latched in a fourth line time period. Said data A-D may be data DATA received at the dual source drive from an external device.

The first digital-to-analog converter DAC1 may output an analog voltage corresponding to the data A in the second and third line time periods, and may output an analog voltage corresponding to the data C in the fourth and fifth line time periods. The second digital-to-analog converter DAC2 may output an analog voltage corresponding to the data B in the third and fourth line time periods.

The first output amplifier AMP1 may amplify and output an analog voltage corresponding to the data A from the first digital-to-analog converter DAC1 in the second and third line time periods. Thereafter, the first output amplifier AMP1 may output an analog voltage corresponding to the data C from the first digital-to-analog converter DAC1 in the fourth and fifth line time periods.

The second output amplifier AMP2 may amplify and output an analog voltage corresponding to the data B from the second digital-to-analog converter DAC2 in the third and fourth line time periods.

A dual source driver 130, S-IC may output the analog voltage corresponding to the data A in the third line time period, output the analog voltage corresponding to the data B in the fourth line time period, and output the analog voltage corresponding to the data C in the fifth line time period. Said output may be understood to be output of data (e.g., analog voltages) by the dual source driver 130 to the panel load.

As illustrated in FIG. 5, the dual source driver 130 may sequentially output analog voltages corresponding to received data to the panel load after the 1-line time latency after data reception (e.g., reception of the data from an external device). Accordingly, the dual source driver 130 may be configured to be driven in a latency of 1-line time until data is received from an external device and the data, or a voltage corresponding to the data, is output to the panel load.

In some example embodiments, the dual source driver 130 according to some example embodiments may update the DAC output as soon as it receives all the line data, and may operate without latency; which may be performed when a horizontal blank period (HBP) is sufficiently secured after data input.

In some example embodiments, as illustrated in FIG. 5, since operating in advance during the 1-line may be performed, there should be 1-line latency such that operating in advance is performed during the second line and the output is performed in the third line, rather than receiving the first line data and outputting in the second line. However, the operation timing according to some example embodiments is limited thereto.

Figure 6:
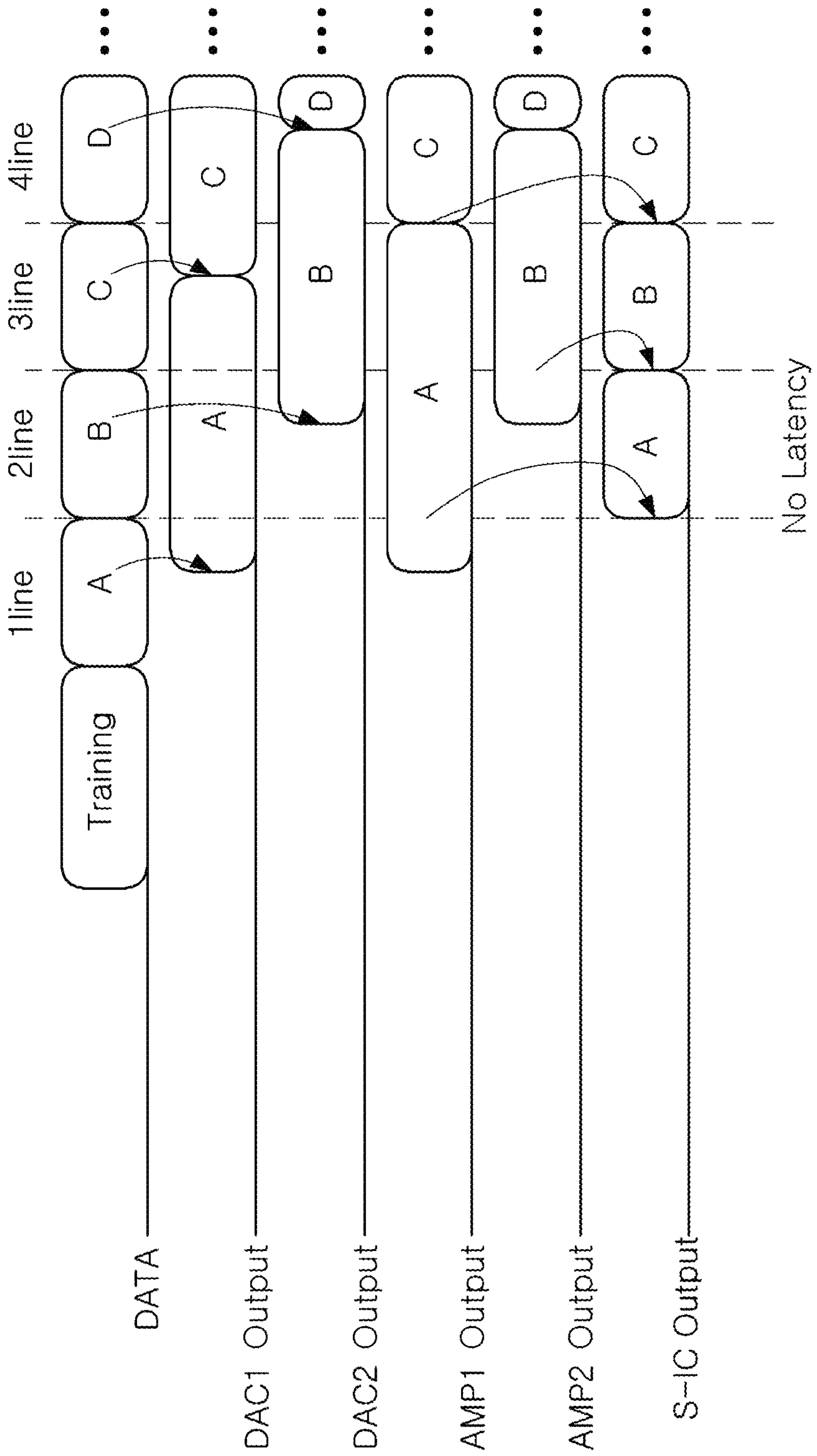
FIG. 6 illustrates an operation timing of a dual source driver according to some example embodiments.

FIG. 6 illustrates an operation timing of the dual source driver 130 according to some example embodiments. Referring to FIG. 6, 1-line data is received, and immediately a preparation operation may be performed such that the output may be performed without latency. Thus, the dual source driver 130 may be configured to sequentially output analog voltages corresponding to received data (e.g., data received from an external device) to the panel load without a latency after reception of the data from the external device. Accordingly, the dual source driver 130 may be configured to be driven without a latency until data is received from an external device and the data, or a voltage corresponding to the data, is output to the panel load.

In some example embodiments, a display drive integrated circuit according to some example embodiments may be implemented to operate a driving cell in a power reduction mode in a latency operation, for example such that the output amplifier of a given driving cell of the first driving cell 131 or the second driving cell 132 is configured to operate in a power reduction mode in response to the given driving cell performing the latency operation. For example, the amplifier of the driving cell may receive different currents from a power supply source based on whether the driving cell is performing a charging operations or a latency operation.

Figure 7A:
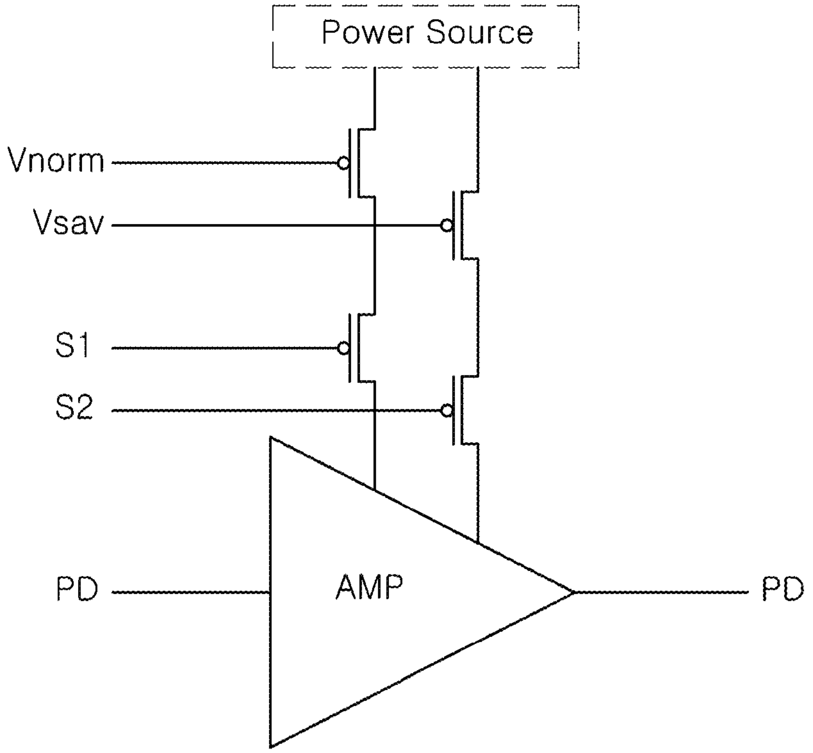
FIGS. 7A and 7B are diagrams illustrating a power reduction mode operation in a latency operation of an output amplifier according to some example embodiments.
Figure 7B:
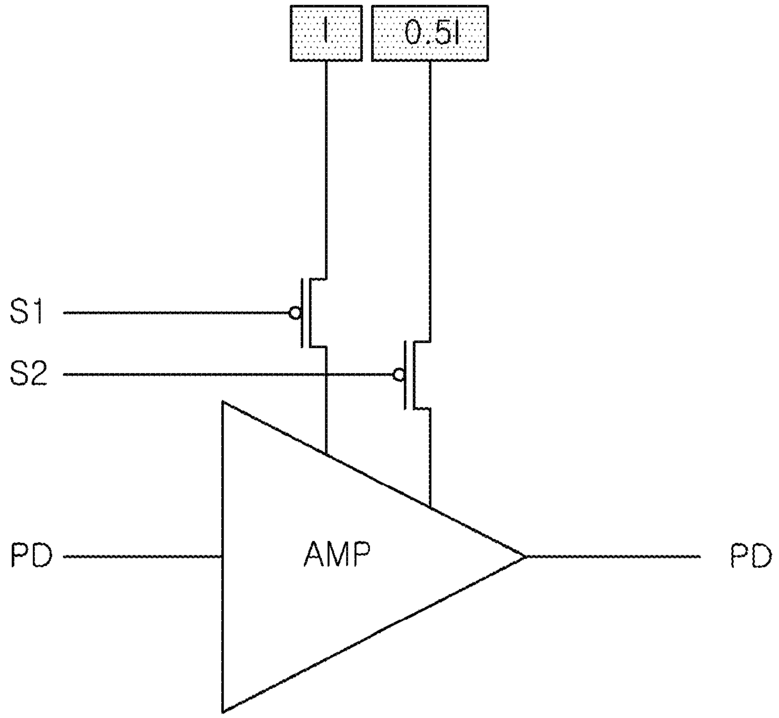

FIGS. 7A and 7B are diagrams illustrating a power reduction mode operation in a latency operation of an output amplifier according to some example embodiments.

FIG. 7A is a diagram illustrating a power reduction mode operation in a latency operation of an output amplifier according to some example embodiments. Referring to FIG. 7A, the output amplifier AMP may selectively receive power from a power source corresponding to a normal voltage Vnorm or to receive power from a power source corresponding to a reduced voltage Vsav according to the operation of the transistors according to switching signals S1 and S2. In some example embodiments, the switching signals S1 and S2 may be signals complementing to each other (e.g., one of switching signals S1 or S2 may be a logic "high" signal while the other one of switching signals S1 or S2 is a logic "low" signal), such that the output amplifier AMP receives power from only one of the power sources at a time (e.g., if switching signal S1 causes a transistor to enable power to be supplied from the power source corresponding to the normal voltage to the output amplifier AMP, switching signal S2 causes a separate transistor to cause power supply from the power source corresponding to the reduced voltage to be inhibited.

FIG. 7B is a diagram illustrating a power reduction mode operation in a latency operation of an output amplifier AMP according to some example embodiments. Referring to FIG. 7B, the output amplifier AMP may selectively receive a normal current (I) or receive a reduced current (e.g., 0.5I) from a power source based on operation of transistors according to the operation of the switching signals S1 and S2. In some example embodiments, the switching signals S1 and S2 may be complementary signals to each other (e.g., one of switching signals S1 or S2 may be a logic "high" signal while the other one of switching signals S1 or S2 is a logic "low" signal), such that the output amplifier AMP receives only one of the normal current (I) or the reduced current (0.5I) at a time (e.g., if switching signal S1 causes a transistor to enable normal current (I) to be supplied to the output amplifier AMP, switching signal S2 causes a separate transistor to cause a supply of reduced current (0.5I) to the output amplifier AMP to be inhibited.

In some example embodiments, including the example embodiments in FIGS. 7A-7B, the first switching signal S1 being in a "high" state to cause normal power or normal current to be supplied to the output amplifier AMP may correspond to the given driving cell in which the output amplifier AMP is located performing a charging operation, and the switching signal S2 being in a "high" state to cause reduced power or reduced current to be supplied to the output amplifier AMP may correspond to the given driving cell performing a latency operation. Accordingly, as shown in FIG. 7B for example, the output amplifier AMP may be is configured to receive different currents from a power supply source based upon whether the given driving cell is performing the charging operation or the latency operation.

In some example embodiments, the reduced current received at the output amplifier AMP based on the driving cell performing the latency operation may be a current between about 30% and about 70% of the normal current (I) received at the output amplifier AMP based on the driving cell performing the charging operation. In some example embodiments, the reduced current received at the output amplifier AMP based on the driving cell performing the latency operation may be a current between about 30% and about 50% of the normal current (I) received at the output amplifier AMP based on the driving cell performing the charging operation. However, the magnitude of the reduced current according to some example embodiments is not limited thereto.

The dual source driver 130 according to some example embodiments may be implemented to wait for the latency operation while maintaining (e.g., performing) the charging operation according to the data pattern.

Figure 8:
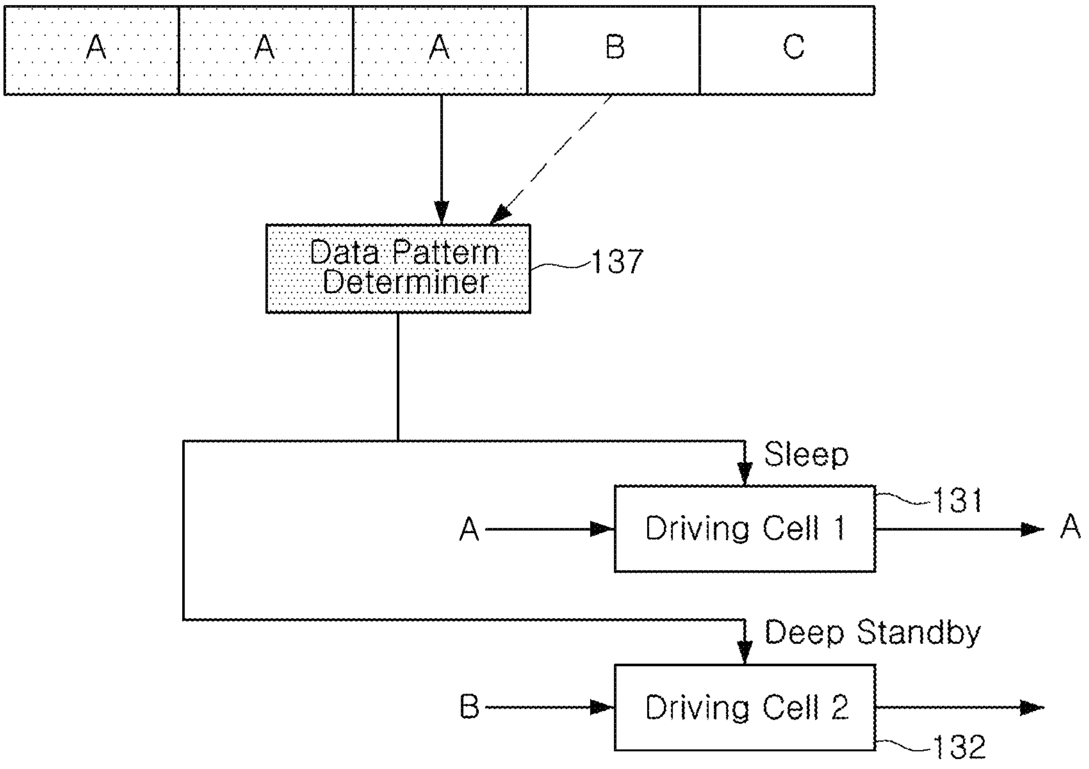
FIG. 8 is a diagram conceptually illustrating an operation according to a data pattern of a dual source driver according to some example embodiments.

FIG. 8 is a diagram conceptually illustrating an operation according to a data pattern of the dual source driver 130 according to some example embodiments. Referring to FIG. 8, a data pattern determiner 137 may determine a pattern of the received data, and the data pattern determiner 137 may determine and thus control an operation mode of the first driving cell 131 and the second driving cell 132 according to the determined pattern of the received data. For example, the data pattern determiner 137 may operate the first driving cell 131 in a sleep mode in response to continuous data A being received at the dual source driver 130, and may maintain the output of the data A. At the same time, the data pattern determiner 137 may cause the second driving cell 132 to enter a deep standby mode when (e.g., in response to a determination that) the first driving cell 131 maintains a sleep mode. For example, the second driving cell 132 may enter the deep standby mode until other data B is determined. Accordingly, the data pattern determiner 137 may cause the first driving cell 131 to enter a sleep mode in which data output is maintained and simultaneously cause the second driving cell to enter a deep standby mode, in response to the data pattern determiner 137 determining that a data pattern of continuous data A being received at the dual source driver 130.

In some example embodiments, in FIG. 2, the first and second driving cells 131 and 132 receive gamma voltages from different gamma voltage generators 133 and 134, respectively. However, some example embodiments is not limited thereto. For example, the first and second driving cells 131 and 132 may receive a gamma voltage from one gamma voltage generator.

Figure 9:
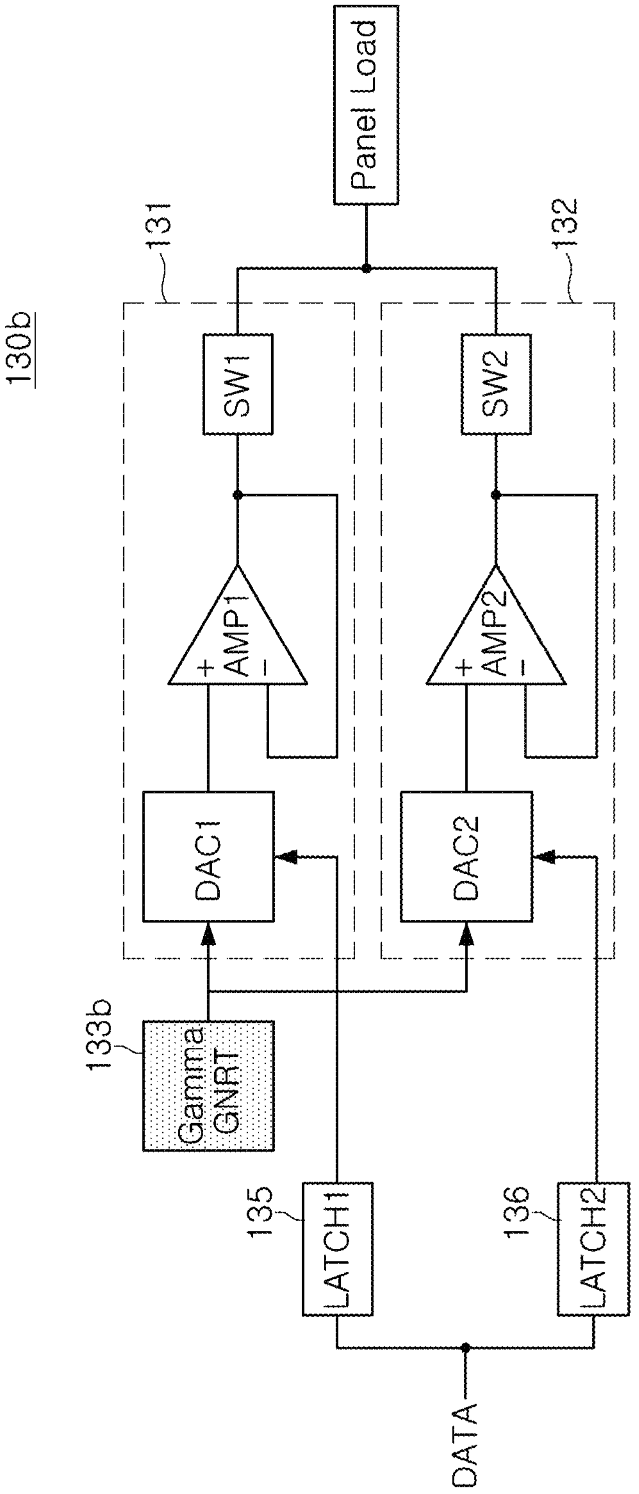
FIG. 9 is a diagram illustrating a dual source driver according to some example embodiments.

FIG. 9 illustrates a dual source driver 130*a* according to some example embodiments. Referring to FIG. 9, the dual source driver 130*a* may be implemented with one gamma voltage generator 133*b* compared to that illustrated in FIG. 2.

In some example embodiments, the display device 100 illustrated in FIG. 1 is implemented with a single gate driver. However, the present inventive concepts is not limited thereto.

Figure 10A:
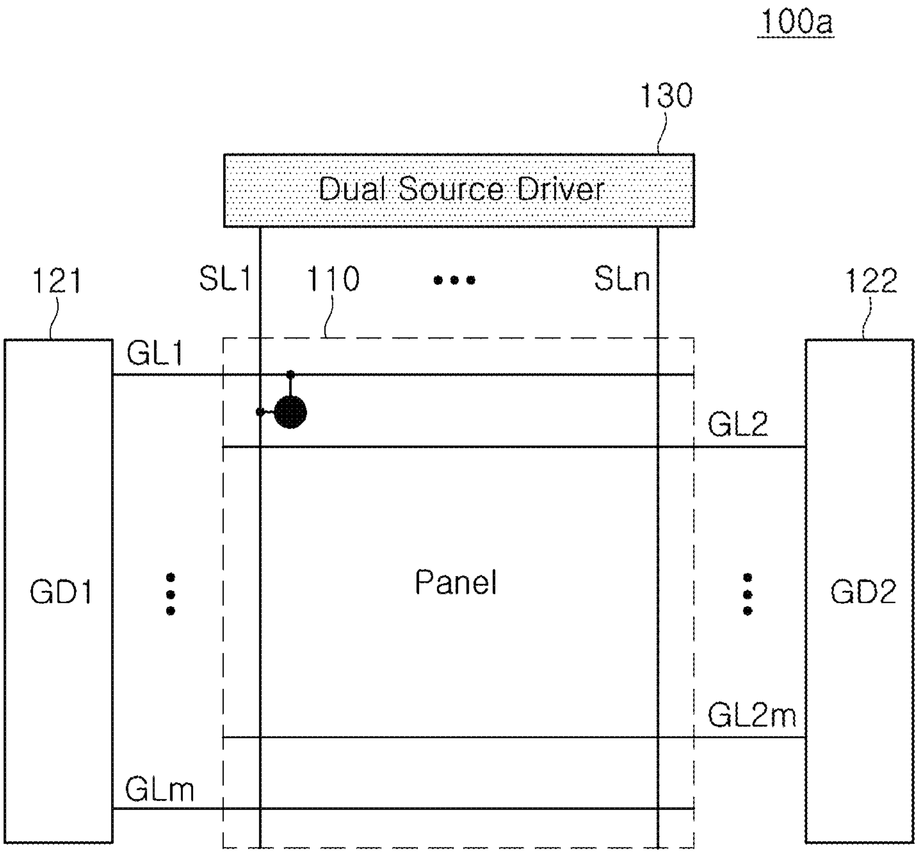
FIGS. 10A, 10B, and 10C are drawings illustrating display devices according to some example embodiments.
Figure 10B:
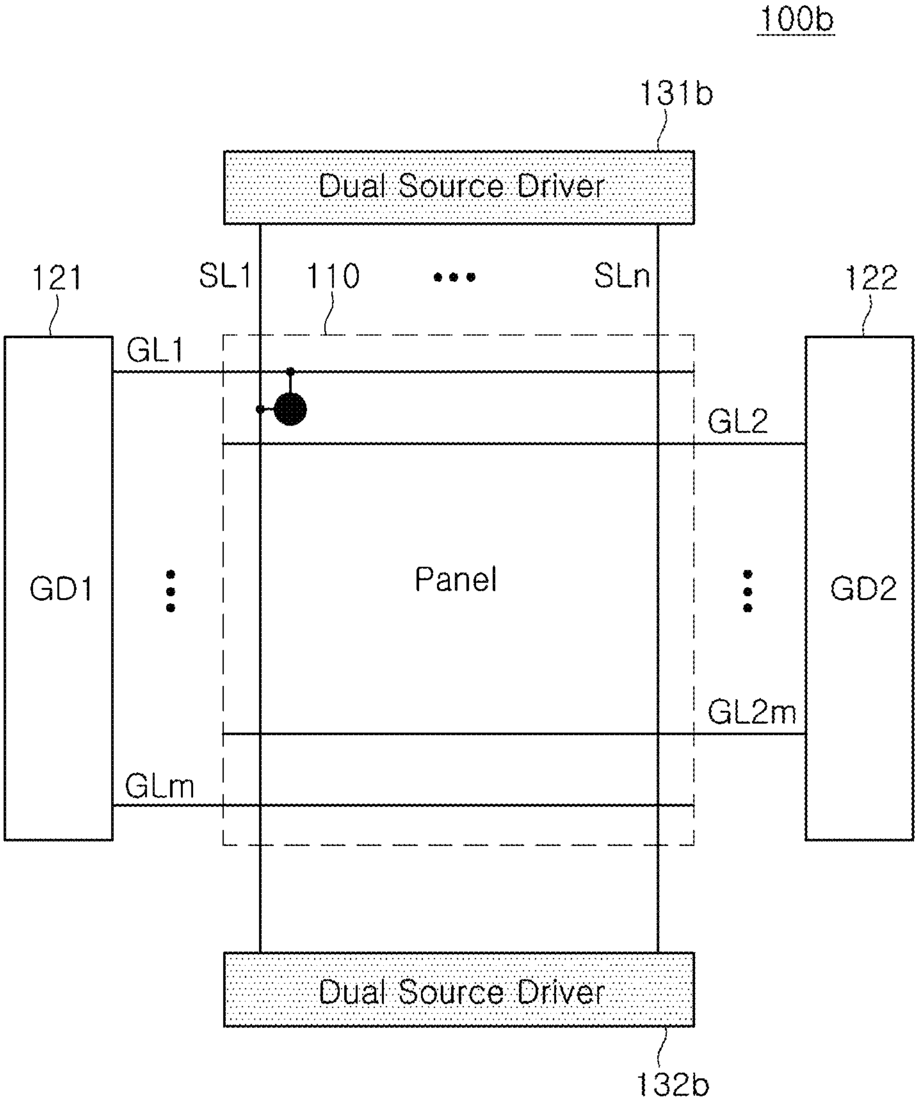
Figure 10C:
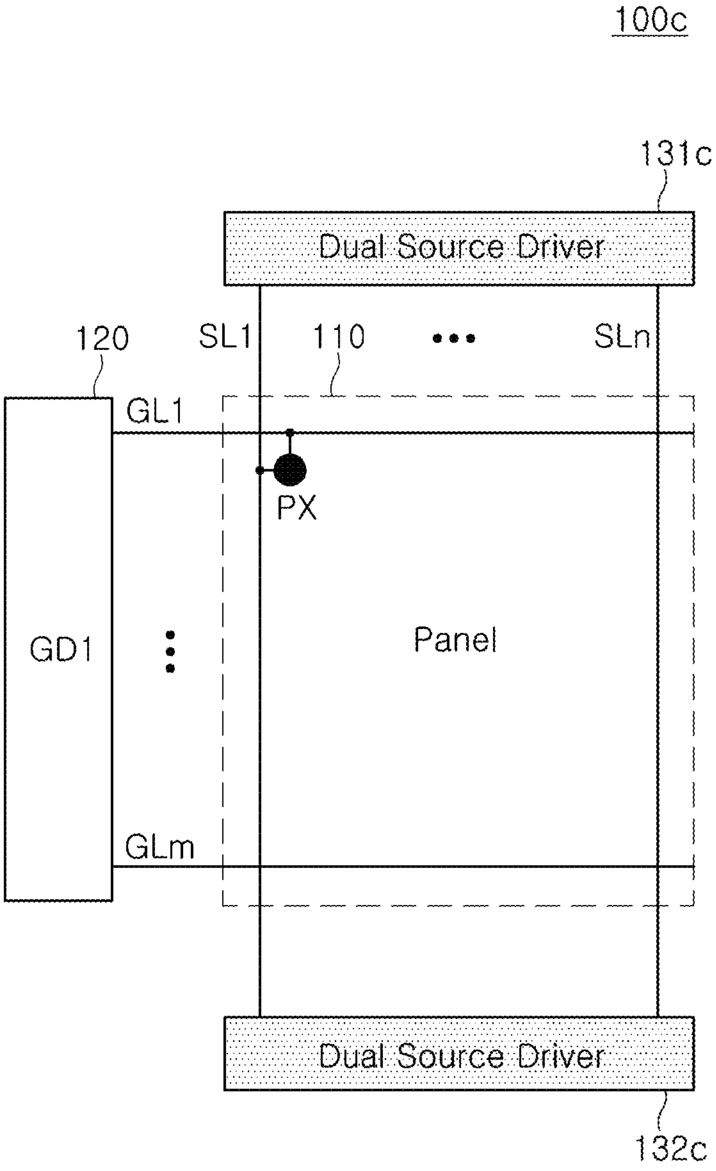

FIGS. 10A, 10B, and 10C are drawings illustrating display devices 100*a*, 100*b* and 100*c* according to some example embodiments. Referring to FIG. 10A, the display device 100*a* has a difference in terms of the gate driver 120 being comprised of first and second gate drivers 121 and 122, compared to the display device 100 illustrated in FIG. 1. The first gate driver 121 may activate odd gate lines GL1, . . . , m, and the second gate driver 122 may activate even gate lines GL2, . . . , 2*m*. Restated, the first gate driver 121 may be configured to drive odd gate lines GL1, . . . , m of the plurality of gate lines GL1 to GLm, and the second gate driver may be configured to drive even gate lines GL2, . . . , 2*m* of the plurality of gate lines GL1 to GLm.

Referring to FIG. 10B, the display device 100*b* has a difference in that the display device is comprised of first and second dual source drivers 131*b* and 132*b* as compared to the display device 100*a* illustrated in FIG. 10A. In some example embodiments, each of the first and second dual source drivers 131*b* and 132*b* may be implemented to provide an analog voltage to a corresponding panel load by switching operations corresponding to the outputs of the first and second driving cells as described above.

Referring to FIG. 10C, the display device 100*c* has a difference in that the display device is comprised of one gate driver 120, compared to the display device 100*b* illustrated in FIG. 10B.

Figure 11:
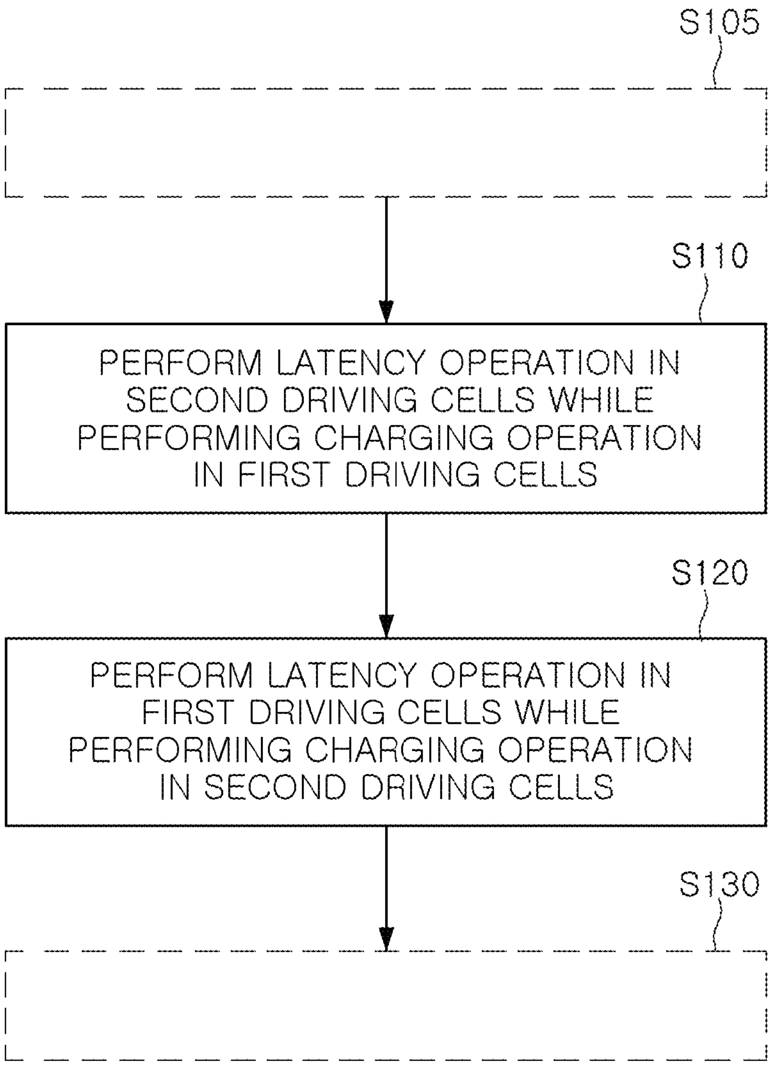
FIG. 11 is a flowchart illustrating a method of operating a dual source driver of a display device according to some example embodiments.

FIG. 11 is a flowchart illustrating a method of operating the dual source driver 130 of the display device 100 according to some example embodiments, where the method may be performed according to any of the devices, drivers, units, modules, or the like according to any of the example embodiments. Referring to FIGS. 1 to 11, a method of operating the display device 100 may proceed as follows.

While performing the first charging operation in the respective first driving cells in the first line time period, the first latency operation may be performed in the respective second driving cells (S110). Restated, at S110, the second driving cell(s) may be caused to perform a first latency operation concurrently with the first driving cell(s) being caused to perform a first charging operation, in a first line time period. Thereafter, while performing the second charging operation in the respective second driving cells in the second line time period, the second latency operation may be performed in the respective first driving cells (S120). Restated, at S120, the second driving cell(s) may be caused to perform a second charging operation concurrently with the first driving cell(s) being caused to perform a second latency operation, in a second line time period.

In some example embodiments, a training operation in which clock data recovery (CDR) is locked at a particular (or, alternatively, predetermined) constant frequency may be further performed by a display device 100 and/or a dual source driver 130 (S130).

In some example embodiments, in the first charging operation of the first driving cells (e.g., when causing the first driving cells to perform the first charging operation), first analog voltages corresponding to the first line data may be output from the first driving cells to the corresponding panel load, and in the first latency operation of the second driving cells (e.g., when causing the second driving cells to perform the first latency operation), second analog voltages corresponding to the second line data may be prepared at the second driving cells.

In some example embodiments, the operating method may further include receiving the first line data during the 1-line time before performing the first charging operation (S105); and receiving the second line data during the 1-line time among (e.g., during) the first charging operations at S110 (e.g., during the first line time).

In some example embodiments, the first charging operation may be performed during a 2-line time.

In some example embodiments, the method may further include receiving the first line data during the 1-line time (e.g., at S105); and receiving second line data during the 2-line time (e.g., at S110). In some example embodiments, the first charging operation may be started, by the device implementing the method, before the second line data is received at the device implementing the method.

In the method of operating the dual source driver 130 of the display device 100 according to some example embodiments, a charging operation is performed in any one driving cells while simultaneously performing a latency operation in other driving cells, thereby significantly reducing operating time of panel load.

Figure 12A:
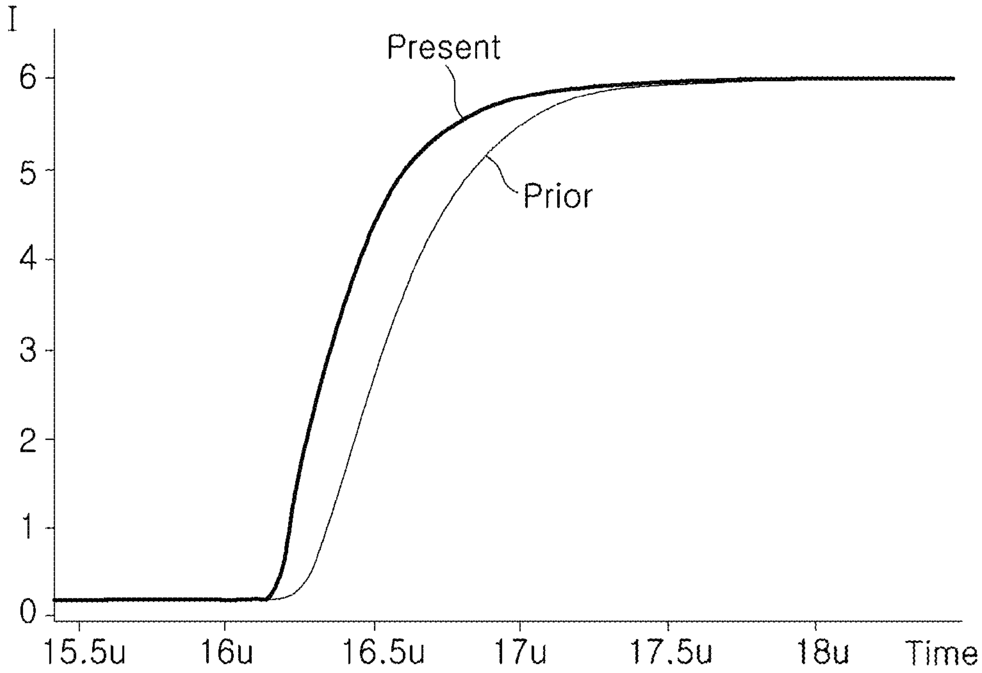
FIGS. 12A, 12B, and 12C are drawings illustrating a charging rate and a pattern-specific deviation of a dual source driver according to some example embodiments.
Figure 12B:
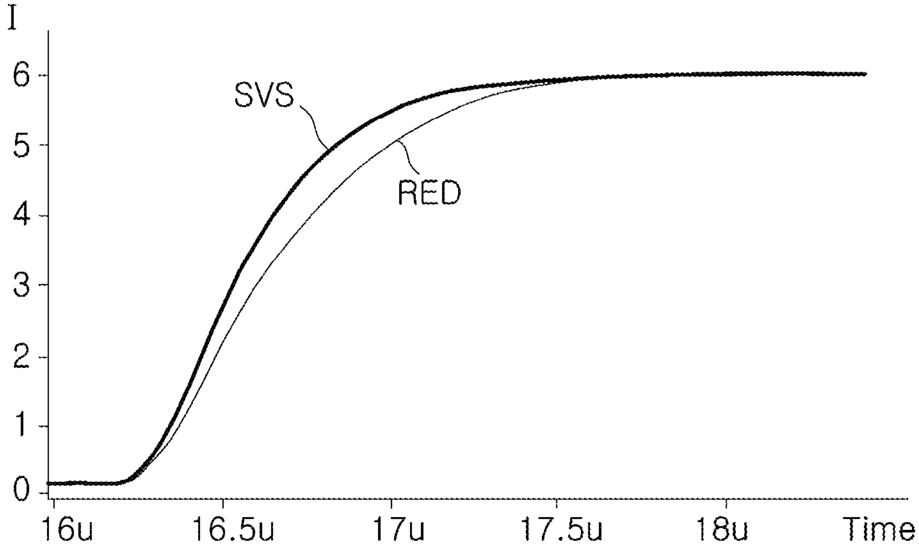
Figure 12C:
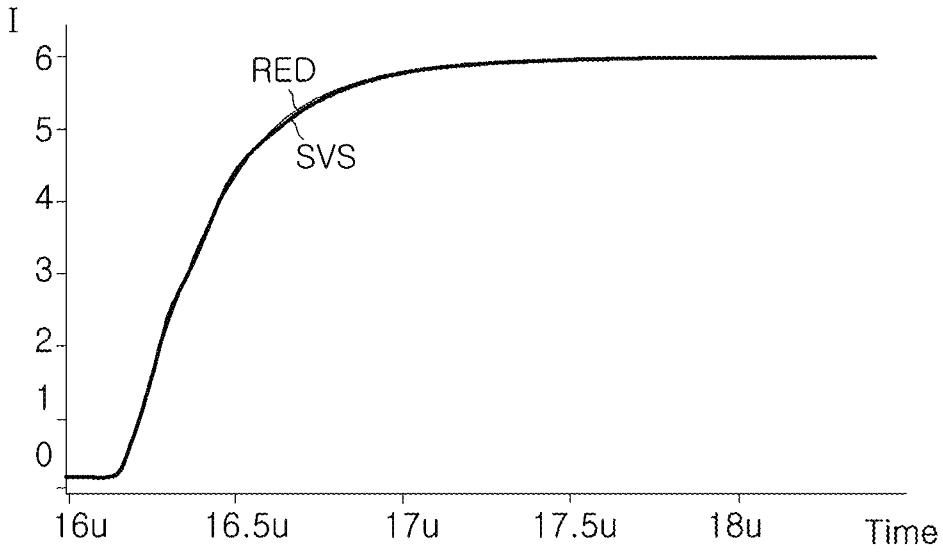

FIGS. 12A, 12B, and 12C are drawings illustrating a charging rate and each pattern deviation of the dual source driver 130 according to some example embodiments. FIG. 12A is a diagram illustrating a charging rate of the dual source driver 130 according to some example embodiments. Referring to FIG. 12A, the charging rate of the dual source driver 130 is improved compared to that of the related art. FIG. 12B is a diagram illustrating each pattern deviation of the dual source driver 130 according to some example embodiments. Referring to FIG. 12B, there is a deviation between the RED pattern and the SVS pattern in the related art source driver, but referring to FIG. 12C, the dual source driver 130 according to some example embodiments has almost no deviation between the RED pattern and the SVS pattern.

Figure 13:
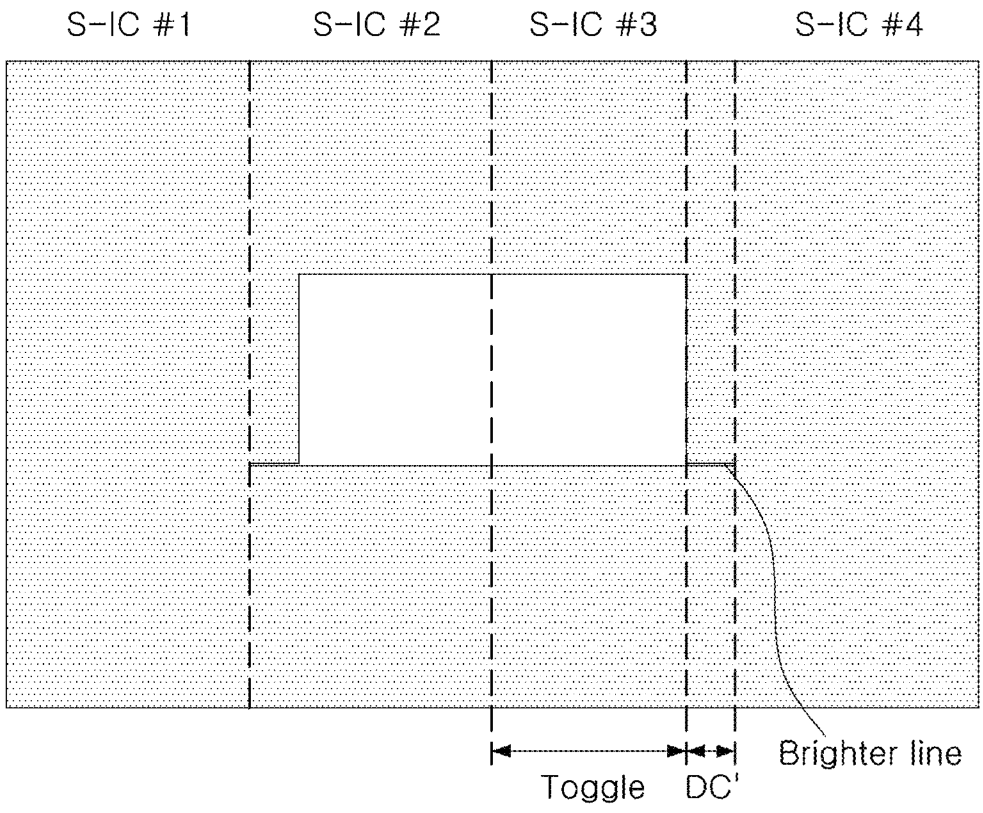
FIG. 13 is a diagram illustrating a cross talk problem of a general DAC output.

FIG. 13 is a diagram illustrating a cross talk problem of a general DAC output. As illustrated in FIG. 13, as the DC output continues for a certain period due to a charge sharing problem in a region toggling in the third source driver (S-IC #3), a brighter line may be displayed.

Figure 14A:
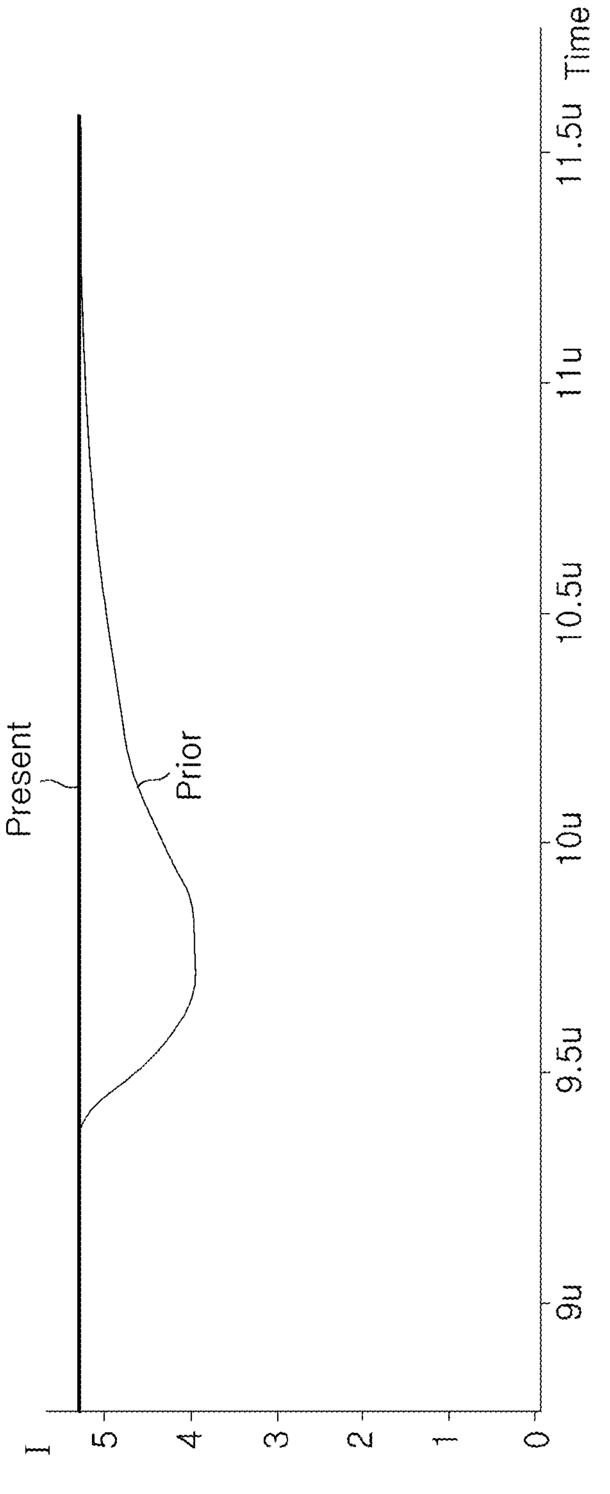
FIGS. 14A and 14B are diagrams illustrating simulation results for toggle and DC output according to a dual source driver according to some example embodiments.
Figure 14B:
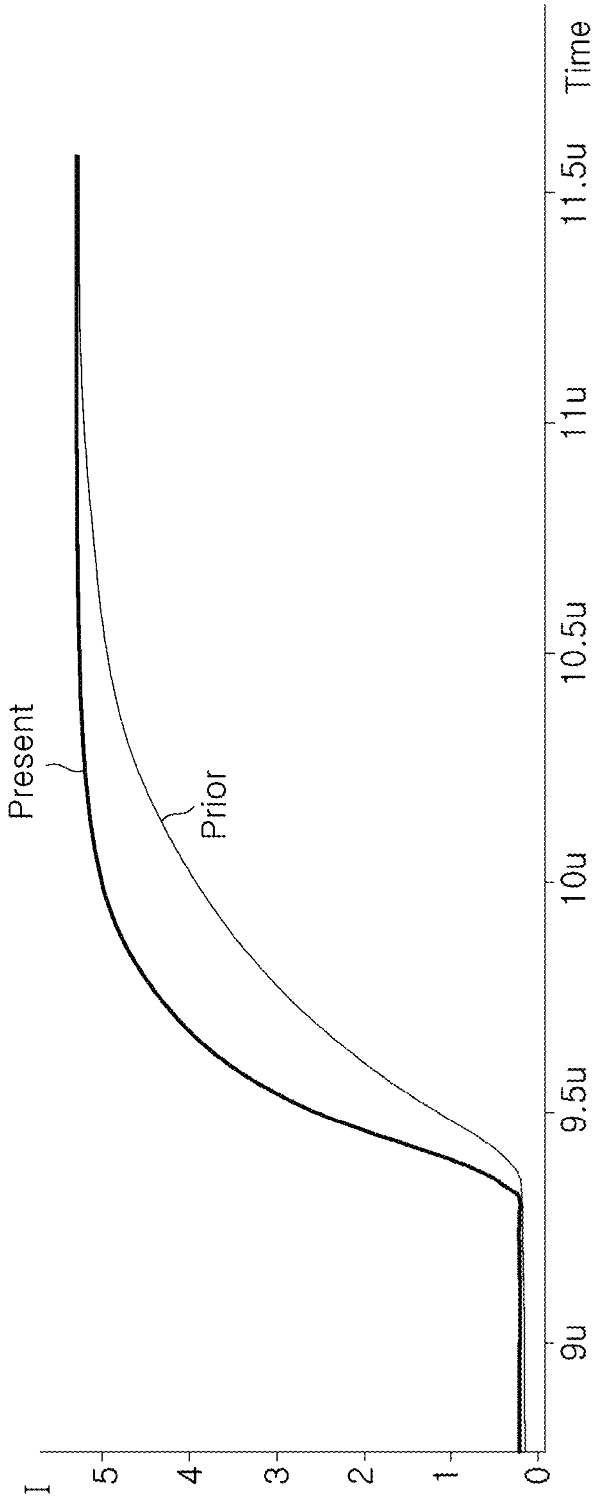

FIGS. 14A and 14B are diagrams illustrating simulation results for toggle and DC output based on the dual source driver 130 according to some example embodiments, as examples. Referring to FIG. 14A, in the DC region, in some example embodiments, a constant output may be maintained without fluttering, unlike in the related art. There is little change in DAC output when the output goes out. Therefore, the crosstalk problem may be prevented. Referring to FIG. 14B, the output according to some example embodiments is set to be higher than the output in the related art.

In some example embodiments, a display drive integrated circuit according to some example embodiments may further include a function of controlling a touch panel. In a display device, a touch panel may be provided in a display device together with a display panel to provide a touch sensing function. The controller for the touch sensing operation may be integrated into the same chip in the display driving circuit.

Figure 15:
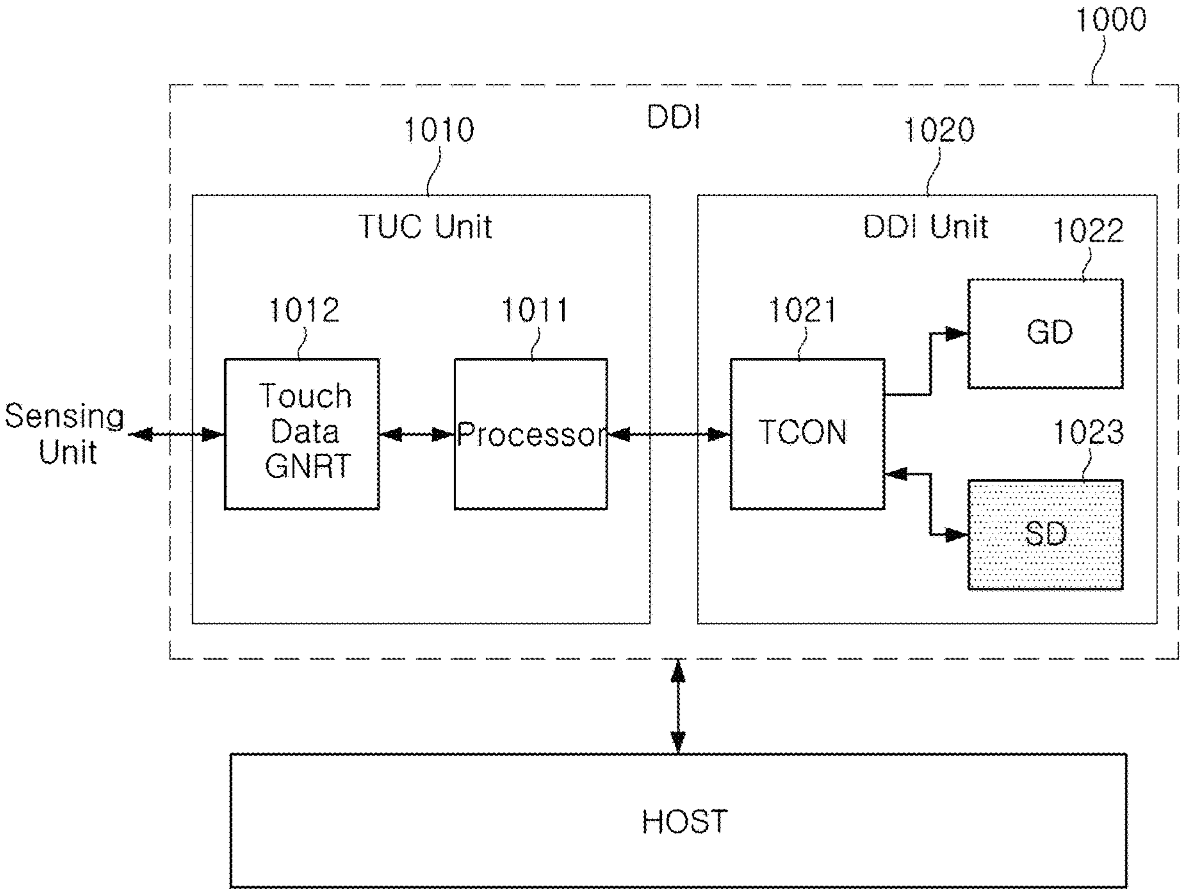
FIG. 15 is a drawing illustrating a display drive integrated circuit according to some example embodiments.

FIG. 15 is a drawing illustrating a display drive integrated circuit according to some example embodiments. Referring to FIG. 15, a display drive integrated circuit 1000 may include a touch screen controller (TUC) 1010 and a display controller (DDI) 1020.

The touch screen controller 1010 may include a signal processor 1011 and a touch data generator 1012. The signal processor 1011 may perform the overall control operation of the circuit in the touch screen controller 1010 in relation to the touch screen operation. The touch data generator 1012 is electrically connected to a plurality of sensing units through a sensing line, and may sense a change in capacitance of sensing units due to a touch operation to generate a sensing signal. In some example embodiments, the touch data generator 1012 may generate and output touch data by processing the generated sensing signal. The signal processor 1011 or the host may determine whether a touch operation is performed on the touch screen and a location where the touch operation is performed by performing a particular (or, alternatively, predetermined) logical operation based on the touch data.

The display controller 1020 may include a timing controller 1021, a gate driver 1022, and a source driver 1023, implement an image on the display panel. In some example embodiments, the display controller 1020 may communicate with an external host.

In some example embodiments, the display controller 1020 may perform an error detection code generation operation and an error detection operation. For example, the timing controller 1021 may generate code data from the display data, and provide a data sequence including the display data and code data to the source driver 1023 through the main link. The source driver 1023 may perform an error detection operation using the received code data, and provide an error counting result to the timing controller 1021.

In addition, the source driver 1023 of the display controller 1020 may be implemented with a dual driving cell structure as described in FIGS. 1 to 14.

In some example embodiments, as illustrated in FIG. 15, the touch screen controller 1010 and the display controller 1020 may be integrated in one chip. Accordingly, at least one information may be transmitted and received between the touch screen controller 1010 and the display controller 1020. For example, at least one timing information used to drive the display panel may be provided to the touch screen controller 1010. The touch screen controller 1010 may generate touch data using the received timing information. In some example embodiments, timing information may be generated from timing controller 1021. According to some example embodiments, timing information may also be generated directly by the host.

In some example embodiments, the dual source driver according to some example embodiments is applicable to a mobile device.

Figure 16:
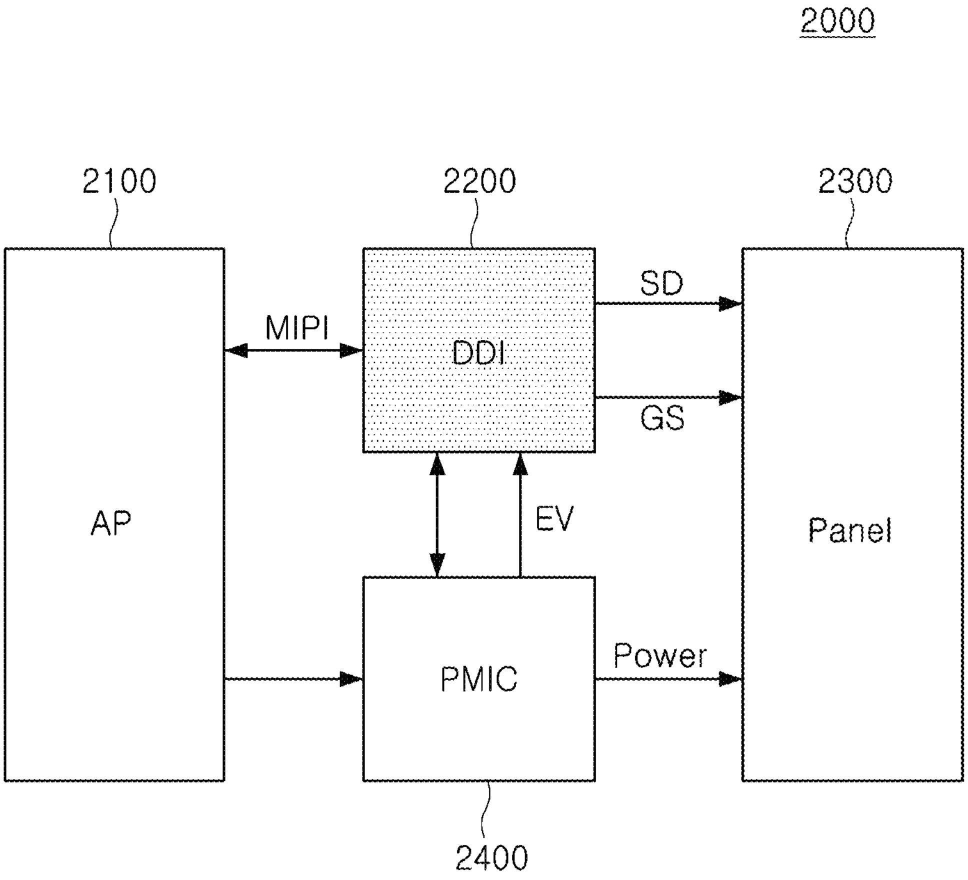
FIG. 16 is a diagram illustrating a mobile device according to some example embodiments.

FIG. 16 is a diagram illustrating a mobile device 2000 according to some example embodiments. Referring to FIG. 16, the mobile device 2000 may include a processor (AP) 2100, a display driving circuit (DDI) 2200, a display panel 2300, and a power supply circuit (PMIC) 2400.

The processor 2100 may be implemented to control the overall operation of the display device. In some example embodiments, the processor 2100 may be implemented as an integrated circuit, a system on a chip, or a mobile application processor (AP). The processor 2100 may transmit data to be displayed, for example, image data, video data, or still image data, to the display driving circuit 2200. In some example embodiments, data may be divided into source data SD units corresponding to horizontal lines (or vertical lines) of the display panel 2300.

The display driving circuit 2200 may change data transmitted from the processor 2100 to a form that may be transmitted to the display panel 2300, and may transmit the changed data to the display panel 2300. The source data SD may be supplied in units of pixels.

In some example embodiments, the display driving circuit 2200 may include the dual source driver described with reference to FIGS. 1 to 14 or may be implemented by the operation of the dual source driver.

A processor interface may interface signals or data exchanged between the processor 2100 and the display driving circuit 2200. The processor interface may interface the source data (SD, line data) transmitted from the processor 2100 and may transmit the data to the display driving circuit 2200. In some example embodiments, the processor interface may be an interface related to a serial interface, such as a Mobile Industry Processor Interface (MIPI), a Mobile Display Digital Interface (MDDI), a DisplayPort, an Embedded DisplayPort (eDP) or the like.

The display panel 2300 may display source data SD by the display driving circuit 2200.

The power supply circuit 2400 may be implemented to manage power of the display device. In some example embodiments, the power supply circuit 2400 may include a power management integrated circuit (PMIC), a charger integrated circuit (IC), or a battery or fuel gauge. Further, the power supply circuit 2400 may use a wired and/or wireless charging method. The wireless charging method includes, for example, a magnetic resonance method, a magnetic induction method, or an electromagnetic wave method, and may further include a method using an additional circuit for wireless charging, for example, a coil loop, a resonance circuit, or a rectifier.

The power supply circuit 2400 may receive commands from the processor 2100 to supply power to respective portions of the display device. The power supply circuit 2400 may supply power to the display driving circuit 2200 and the display panel 2300, respectively. For example, the power supply circuit 2400 may provide an external voltage EV to the display driving circuit 2200. In some example embodiments, the external voltage EV may be processed and used inside the display driving circuit 2200. The power interface may interface between the power supply circuit 2400 and the display driving circuit 2200. For example, the power interface may transmit commands that the display driving circuit 2200 transmits to the power supply circuit 2400. The power interface may be provided separately from the processor interface. The display driving circuit 2200 may be directly connected to the power supply circuit 2400 without going through the processor 2100.

The dual source driver according to some example embodiments is applicable to a foldable smartphone. In general, a foldable smart phone may be implemented in various foldable display forms such as C-INFOLD, C+1, G, C-OUTFOLD, S, and the like. Generally, a foldable smart phone may be divided into an in-fold structure and an out-fold structure depending on a folding method.

Figure 17A:
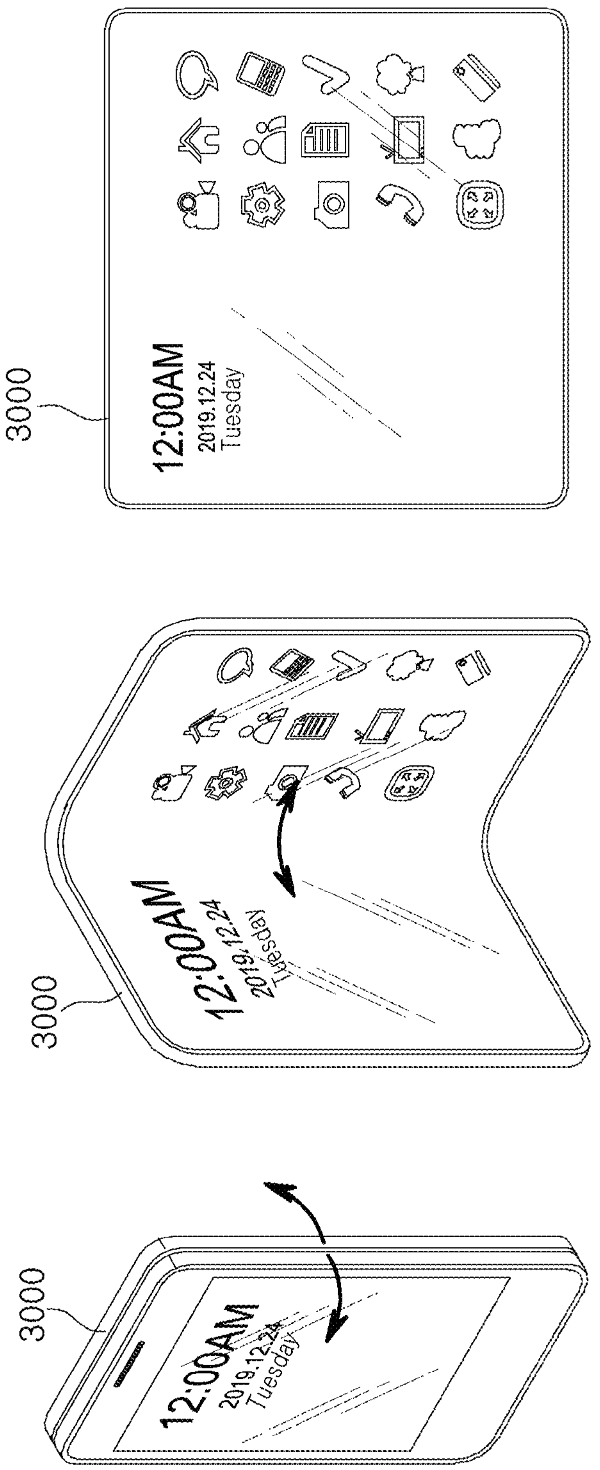
FIGS. 17A and 17B are drawings illustrating a foldable smartphone according to some example embodiments.
Figure 17B:
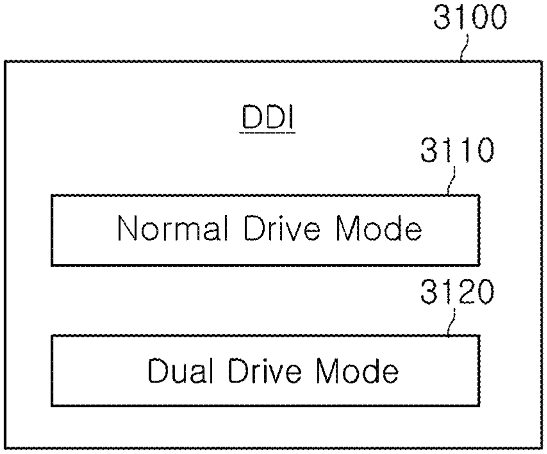

FIGS. 17A and 17B are drawings illustrating a foldable smartphone 3000 according to some example embodiments.

Referring to FIG. 17A, the foldable smartphone 3000 has a structure in which the display screen is folded inward. For example, the foldable smartphone 3000 may be Samsung Electronics' Galaxy Fold. The Galaxy Fold has another display on the outside for use when folded, to have the form of 'C+1' according to the above classification. Unlike the out-fold structure, the display may be unfolded neatly as the length deviation of the surface is relatively low when folded.

Referring to FIG. 17B, the foldable smartphone 3000 may include a display drive integrated circuit DDI 3100 operating in a normal drive mode 3110 or a dual drive mode 3120. In some example embodiments, the dual drive mode 3120 may implement the function of the dual source driver, as described in FIGS. 1 to 14. For example, in the folded state, the display drive integrated circuit 3100 may operate in the normal drive mode 3110 and in the unfolded state, the display drive integrated circuit 3100 may operate in the dual drive mode 3120.

Figure 18:
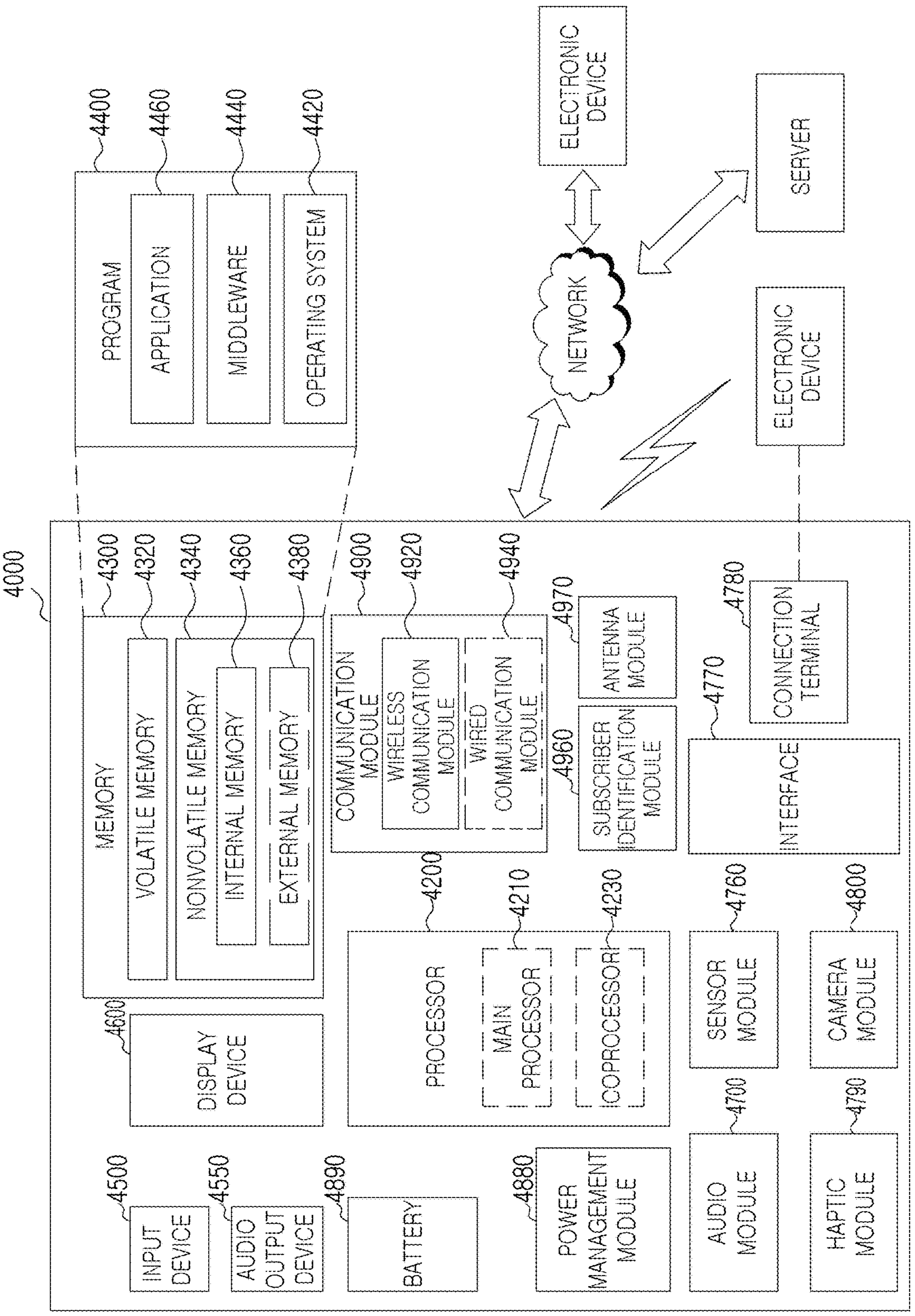
FIG. 18 is a diagram illustrating an electronic device according to some example embodiments.

FIG. 18 is a diagram illustrating an electronic device according to some example embodiments. FIG. 18 is a block diagram of an electronic device 4000 according to some example embodiments. In a network environment, the electronic device 4000 may communicate with other electronic devices through a first network (e.g., short-range wireless communication) or with other electronic devices or servers through a second network (e.g., remote wireless communication). The electronic device 4000 may include at least one of, for example, a smart phone, a tablet personal computer (PC), a mobile phone, a video phone, an e-book reader, a desktop personal computer, a laptop personal computer (PC), a netbook computer, a workstation, a server, a personal digital assistant (PDA), a portable multimedia player (PMP), an MP3 player, a mobile medical device, a camera, or a wearable device. According to various example embodiments, the wearable device may include at least one of an accessory type (for example, a watch, a ring, a bracelet, an anklet, a necklace, glasses, contact lenses, or a head-mounted device (HMD)), a fabric or clothing type (for example, an electronic garment), a body attachment type (for example, a skin pad or a tattoo), or a living body implantation type (for example, an implantable circuit).

Referring to FIG. 18, the electronic device 4000 may include a processor 4200, a memory 4300, an input device 4500, an audio output device 4550, a display device 4600, an audio module 4700, a sensor module 4760, an interface 4770, a haptic module 4790, a camera module 4800, a power management module 4880, a battery 4896, a communication module 4900, a subscriber identification module 4960, and an antenna module 4970. In some example embodiments, at least one of the components of the electronic device 4000 may be omitted or other components may be added. For example, as in the case of the embedded sensor module 4760 (a fingerprint sensor, an iris sensor, or an illuminance sensor), the display device 4600 may be implemented by integrating some components.

The processor 4200 drives software (e.g., a program 4400) to control at least one or more other components (e.g., a hardware or software component) of the electronic device 4000 connected to the processor 4200, thereby performing various data processing and calculations. In addition, the processor 4200 may load the command or data received from other components (for example, the sensor module 4760 and the communication module 4900) into a volatile memory 4320 and may process the data, and may store the result data in a nonvolatile memory 4340.

In some example embodiments, the processor 4200 operates independently of a main processor 4210 (a central processing unit or an application processor), and additionally/in some example embodiments, uses power lower than that of the main processor 4210, or may include a coprocessor 4230 specialized for a designated function, for example, a graphics processing processor, an image signal processor, a sensor hub processor, a communication processor, or an artificial intelligence processor.

In some example embodiments, the coprocessor 4230 may be operated separately from the main processor 4210 or may be embedded and operated. The coprocessor 4230 may replace the main processor 4210 while the main processor 4210 is in an inactive (slip) state, or may operate together with the main processor 4210 while the main processor 4210 is in an active (application execution) state. For example, the coprocessor 4230 may control at least a portion of the functions or states associated with at least one of the components of the electronic device 4000, such as the display device 4600, the sensor module 4760, or the communication module 4900. In some example embodiments, the coprocessor 4230 may be implemented as some component of another functionally related component (e.g., the camera module 4800 or the communication module 4900).

The memory 4300 may store various data used by at least one component (e.g., the processor 4200 or the sensor module 4760) of the electronic device 4000, for example, software and input data or output data or output data with respect to instructions related to the software. The memory 4300 may include a volatile memory 4320 or a nonvolatile memory 4340.

The program 1400 is software stored in the memory 4300, and may include an operating system 4420, a middleware 4440, or an application 4460.

The input device 4500 is a device for receiving commands or data to be used for components (the processor 4200) of the electronic device 4000, from the outside (a user) of the electronic device 4000, and for example, may include a microphone, a mouse or a keyboard.

The audio output device 4550 is a device for outputting an audio signal to the outside of the electronic device 4000, and for example, may include a speaker used for general uses such as multimedia playback or recording playback, and a receiver used exclusively for receiving calls. In some example embodiments, the receiver may be formed integrally or separately from the speaker.

The display device 4600 may be implemented to visually provide information to a user of the electronic device 4000. For example, the display device 4600 may include a display, a hologram device, or a projector and a control circuit for controlling the device. In some example embodiments, the display device 4600 may include a touch circuitry or a pressure sensor capable of measuring the intensity of pressure on the touch.

Further, the display device 4600 may be implemented by a display device that enables dual source output described in FIGS. 1 to 14 and by an operation method thereof.

The audio module 4700 may convert sound and electric signals in both directions. In some example embodiments, the audio module 4700 acquires sound through the input device 4500, or may output sound through the audio output device 4550, or an external electronic device (a speaker or headphone) connected to the electronic device 4000 by wire or wireless.

The sensor module 4760 may generate an electrical signal or data value corresponding to an internal operating state (power or temperature) of the electronic device 4000 or an external environmental state. For example, the sensor module 4760 includes a gesture sensor, a gyro sensor, a barometric pressure sensor, a magnetic sensor, an acceleration sensor, a grip sensor, a proximity sensor, a color sensor, an infrared (IR) sensor, a biological sensor, a temperature sensor, a humidity sensor, or an illuminance sensor.

The interface 4770 may support a designated protocol, to be connected to an external electronic device by wire or wirelessly. In some example embodiments, the interface 4770 may include a high definition multimedia interface (HDMI), a universal serial bus (USB) interface, an SD card interface, or an audio interface.

A connection terminal 4780 may include a connector (for example, an HDMI connector, a USB connector, an SD card connector, or an audio connector (headphone connector)) to physically connect the electronic device 4000 and an external electronic device.

The haptic module 4790 may convert electrical signals into mechanical stimuli (vibrations or movements) or electrical stimuli that the user may perceive through tactile or motor sensations. The haptic module 4790 may include, for example, a motor, a piezoelectric element, or an electrical stimulation device.

The camera module 4800 may be implemented to capture still images and videos. In some example embodiments, the camera module 4800 may include one or more lenses, an image sensor, an image signal processors, or a flash. The camera module 4800 may control pixels that optimally select a conversion gain depending on operation modes.

The power management module 4880 is a module for managing power supplied to the electronic device 4000, and may be configured, for example, as at least a portion of a power management integrated circuit (PMIC). The battery 4890 is a device for supplying power to at least one component of the electronic device 4000, and may include, for example, a non-rechargeable primary cell, a rechargeable secondary cell, or a fuel cell.

The communication module 4900 may support establishing a wired or wireless communication channel between the electronic device 4000 and an external electronic device, and performing communication through the established communication channel. The communication module 4900 may include one or more communication processors supporting wired communication or wireless communication, independently operated from the processor 4200 (an application processor).

In some example embodiments, the communication module 4900 may include a wireless communication module 4920 (a cellular communication module, a short-range wireless communication module, or a global navigation satellite system (GNSS) communication module) or a wired communication module 4940 (a local area network (LAN) communication module, or a power line communication module). The communication module 4900 may communicate with external electronic devices through a first network (for example, a short-range communication network such as Bluetooth, Wi-Fi direct or an infrared data association (IrDA)) or a second network (e.g., a cellular network, the Internet, or a telecommunication network such as a computer network (LAN or WAN)), using a corresponding wired/wireless communication module. In some example embodiments, the communication module 4900 may be implemented as one chip or may be implemented as separate chips.

In some example embodiments, the wireless communication module 4920 may distinguish and authenticate the electronic device 4000 in the communication network using user information stored in the subscriber identification module 4960.

The antenna module 4970 may include one or more antennas for transmitting a signal or power to the outside or receiving a signal or power from an external device. In some example embodiments, the communication module 4900 may transmit a signal to an external electronic device through an antenna suitable for a communication method, or receive a signal from the external electronic device.

Some of the components are connected to each other via a communication method between peripheral devices, for example, through a bus, a general purpose input/output (GPIO), a serial peripheral interface (SPI), or a mobile industry processor interface (MIPI) to exchange signals (e.g., commands or data) with each other.

In some example embodiments, the command or data may be transmitted or received between the electronic device 4000 and an external electronic device through a server connected to the second network. Each of the electronic devices may be the same as or a different type of device from the electronic device 4000. In some example embodiments, all or a portion of the operations executed in the electronic device 4000 may be executed in another external device or a plurality of external electronic devices. In some example embodiments, when the electronic device 4000 is to perform a certain function or service automatically or by request, the electronic device 4000 may request at least some associated functions or services from an external electronic device, additionally, or rather than executing the function or service itself. The external electronic device receiving the request may execute a requested function or an additional function, and may deliver the result to the electronic device 4000. The electronic device 4000 may process the received result as it is or additionally to provide the requested function or service. To this end, for example, cloud computing, distributed computing, or client-server computing technology may be used.

In some example embodiments, the electronic device 4000 may be various types of devices. For example, the electronic device 4000 may include at least one of a portable communication device (e.g., a smartphone), a computer device, a portable multimedia device, a portable medical device, a camera, a wearable device, or a home appliance.

The term "module" used herein includes a unit comprised of hardware, software, or firmware, and may be used interchangeably with terms such as logic, logic blocks, components, or circuits. In various embodiments of an integrally configured component, the module may be implemented by software (e.g., a program 4400) that includes instructions stored in a machine (for example, computer)-readable storage media (e.g., an internal memory 4360 or an external memory 4380). The device is a device capable of invoking a stored command from a storage medium and operating according to the called command, and may include an electronic device (e.g., the electronic device 4000) according to the described example embodiments. When an instruction is executed by a processor (for example, the processor 4200), the processor may perform a function corresponding to the instruction directly or by using other components under the control of the processor. Instructions may include code generated or executed by a compiler or interpreter. The storage medium readable by the machine may be provided in the form of a non-transitory storage medium. In some example embodiments, 'non-transitory' means that the storage medium does not include a signal and is tangible, but does not distinguish between data being stored semi-permanently or temporarily on the storage medium.

In some example embodiments, the dual source driver according to some example embodiments is applicable to a monitor.

Figure 19:
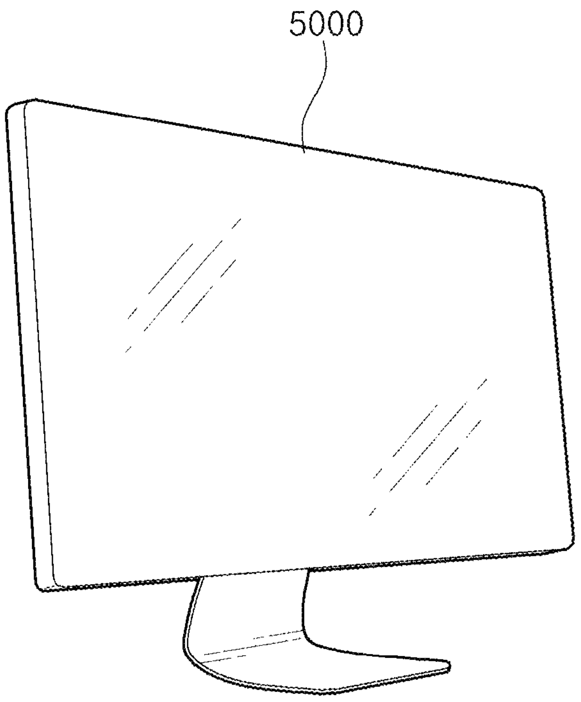
FIG. 19 is a drawing illustrating a monitor according to some example embodiments.

FIG. 19 is a drawing illustrating a monitor 5000 according to some example embodiments. Referring to FIG. 19, the monitor 5000 may include a display device, a polarizing plate, and a window glass. The display device may include a display panel, a printed circuit board, and a display driving circuit. The window glass is generally formed of a material such as acrylic or tempered glass, so that the display module may be protected from external shocks or scratches caused by repeated touches. The polarizing plate may be provided to improve the optical characteristics of the display panel. The display panel may be formed by patterning a transparent electrode on a printed substrate. The display panel may include a plurality of pixel cells for displaying a frame. In some example embodiments, the display panel may be an organic light emitting diode panel. Each pixel cell may include an organic light emitting diode that emits light in response to a current flow. However, it should be understood that the display panel according to some example embodiments is not limited thereto. The display panel may include various types of display elements. For example, the display panel may be one of liquid crystal display (LCD), electrochromic display (ECD), digital mirror device (DMD), activated mirror device (AMD), grating light value (GLV), plasma display panel (PDP), Electro Luminescent Display (ELD), Light Emitting Diode (LED) display, or Vacuum Fluorescent Display (VFD).

The display driving device may be implemented in the same manner as the dual source driver described in FIGS. 1 to 14 and the operations thereof. The display driving device may be mounted with one chip or a plurality of chips. In some example embodiments, the display driving device may be mounted in the form of a chip-on-glass (COG) on a printed substrate formed of glass. In some example embodiments, the display driving device may be mounted in various forms such as a chip on film (COF), a chip on board (COB), and the like.

In addition, the display driving device may further include a touch panel and a touch controller. The touch panel may be formed by patterning a transparent electrode such as Indium Tin Oxide (ITO) on a glass substrate or a Polyethylene Terephthalate (PET) film. The touch panel controller detects the occurrence of a touch on the touch panel, calculates the touch coordinates, and transmits the touch coordinates to the host. The touch panel controller may be integrated with a display driving device in one semiconductor chip.

As set forth above, in a dual source driver according to some example embodiments, a display device including the same, and a method of operating the same, a dual drive structure is used to drive a panel load with one driving cell during one line, and the latency operation of data change, a DAC operation and output amplification is performed with the other driving cell, to thereby eliminate delays such as data change, DAC operation, and input of output amplification. Therefore, the output speed may be improved, and a sufficient voltage may be charged to a panel load in one line.

While some example embodiments have been illustrated and described above, it will be apparent to those skilled in the art that modifications and variations could be made without departing from the scope of the present inventive concepts as defined by the appended claims.

What is claimed is:

1. An operating method of a display device, the display device including a first driving cell and a second driving cell, the method comprising, latching first data at a first line time period;

latching second data at a second line time period;

converting the first data to a first voltage with a first digital-to-analog converter in a latency operation;

amplifying the first voltage with a first output amplifier within 2-line time in a charging operation;

converting the second data to a second voltage by a second digital-to-analog converter;

amplifying the second voltage in a second output amplifier within 2-line time;

outputting the amplified first voltage to a single source line within 1-line time overlapping the converting the first data to the first voltage with the first digital-to-analog converter; and outputting the amplified second voltage to the single source line within 1-line time, wherein the first driving cell and the second driving cell are connected to the single source line in parallel, such that the first driving cell outputs the amplified first voltage to the single source line within 1-line time in the charging operation concurrently with the second driving cell performing the latency operation based on a first switching operation, and the second driving cell outputs the amplified second voltage to the single source line within 1-line time in the charging operation concurrently with the first driving cell performing the latency operation based on a second switching operation, wherein the first switching operation and the second switching operation operate complementarily to each other.

2. The method of claim 1, wherein the first digital-to-analog converter outputs the first voltage in the second line time period and a third line time period.

3. The method of claim 2, wherein the second digital-to-analog converter outputs the second voltage in the third line time period and a fourth line time period.

4. The method of claim 2, wherein the first output amplifier amplifies the first voltage in the second and the third line time periods.

5. The method of claim 4, wherein the second output amplifier amplifies the second voltage in the third line time period and a fourth line time period.

6. The method of claim 1, wherein the amplified first voltage is output to the single source line in a third line time period, and the amplified second voltage is output to the single source line in a fourth line time period.

7. The method of claim 1, wherein the amplified first voltage is output to the single source line in the second line time period, and the amplified second voltage is output to the single source line in a third line time period.

8. The method of claim 7, wherein the first digital-to-analog converter and the first output amplifier output the first voltage in the first line time period.

9. The method of claim 7, wherein the second digital-to-analog converter and the second output amplifier output the second voltage in the second line time period.

10. The method of claim 1, wherein the second digital-to-analog converter and the second output amplifier are applied to different power sources according to the latency operation and the charging operation.

11. A display device, comprising:

a panel including a plurality of pixels at separate, respective intersections of a plurality of gate lines and a plurality of source lines;

a gate driver configured to drive one gate line of the plurality of gate lines in response to a horizontal synchronization signal and a gate control signal;

a source driver configured to drive the plurality of source lines according to data; and a timing controller configured to receive a clock signal, the data, a vertical synchronization signal, and the horizontal synchronization signal, and to control the gate driver and the source driver, wherein the source driver includes a plurality of data drivers corresponding to the plurality of source lines, wherein each of the data drivers is configured to latch first data at a first line time period;

latch second data at a second line time period;

latch third data at a third line time period;

convert the first data to a first voltage in a latency operation;

amplify the first voltage within 2-line time in a charging operation;

convert the second data to a second voltage;

amplify the second voltage in a second output amplifier within 2-line time;

output the amplified first voltage to one source line of the plurality of source lines within 1-line time overlapping the converting the first data to the first voltage; and output the amplified second voltage to the one source line within 1-line time, and wherein each of the data drivers includes a first driving cell connected to the one source line and configured to perform one of the latency operation and the charging operation; and single source line in parallel, such that a second driving cell connected to the one source line in parallel with the first driving cell and configured to perform one of the latency operation and the charging operation, wherein the second driving cell is configured to perform the charging operation when the first driving cell performs the latency operation based on a first switching operation;

wherein the second driving cell is configured to perform the latency operation when the first driving cell performs the charging operation based on a second switching operation; and wherein the first switching operation and the second switching operation operate complementarily to each other.

12. The display device of wherein each of the first driving cell and the second driving cell includes:

a digital-to-analog converter configured to convert latched data to a converted voltage using a gamma voltage;

an output amplifier configured to amplify the converted voltage; and a switch configured to connect output of the output amplifier to the one source line according to a switching signal.

13. The display device of claim 12, wherein the switching signal indicates one of the latency operation and the charging operation.

14. The display device of claim 11, wherein the source driver is driven without a latency until data is received from an external device and the data is output to the panel.

15. A mobile device, comprising:

an application processor that is configured to control overall operations of the mobile device;

a display panel including a plurality of pixels at separate, respective intersections of a plurality of gate lines and a plurality of source lines;

a display driving circuit configured to receive source data from the application processor and to display the source data in the display panel; and a power supply circuit configured to manage power of the application processor, the display panel, and the display driving circuit, wherein the display driving circuit includes a plurality of data drivers corresponding to the plurality of source lines, the plurality of data drivers each including a first driving cell and a second driving cell, wherein each of the plurality of data drivers is configured to latch first data at a first line time period;

latch second data at a second line time period;

latch third data at a third line time period;

convert the first data to a first voltage in a latency operation;

amplify the first voltage within 2-line time in a charging operation;

convert the second data to a second voltage;

amplify the second voltage in a second output amplifier within 2-line time;

output the amplified first voltage to one source line of the plurality of source lines within 1-line time overlapping the converting the first data to the first voltage; and output the amplified second voltage to the one source line within 1-line time, and wherein the first driving cell and the second driving cell are connected in parallel to the one source line such that the first driving cell outputs the amplified first voltage to the one source line within 1-line time in the charging operation concurrently with the second driving cell performing the latency operation based on a first switching operation, and the second driving cell outputs the amplified second voltage to the one source line within 1-line time in the charging operation concurrently with the first driving cell performing the latency operation based on a second switching operation, wherein the first switching operation and the second switching operation operate complementarily to each other.

16. The mobile device of claim 15, wherein the display driving circuit includes: a first gamma voltage generator configured to generate a first gamma voltage; and a second gamma voltage generator configured to generate a second gamma voltage.

17. The mobile device of claim 16, wherein the each of the plurality of data drivers includes: a first latch configured to latch the first data; and a second latch configured to latch the second data.

18. The mobile device of claim 17, wherein the first driving cell is configured to receive the first gamma voltage from the first gamma voltage generator and to receive the first data from the first latch, and to transmit a first corresponding voltage corresponding to the first data and the first gamma voltage to the one source line according to the first switching operation; and the second driving cell is configured to receive the second gamma voltage from the second gamma voltage generator and to receive the second data from the second latch, and to transmit a second corresponding voltage corresponding to the second data and the second gamma voltage to the one source line according to the second switching operation.

19. The mobile device of claim 15, wherein the display driving circuit performs a power reduction operation in the latency operation.

* * * * *